(12) United States Patent
Nakagiri

(10) Patent No.: US 6,351,314 B1
(45) Date of Patent: Feb. 26, 2002

(54) PRINTING SYSTEM, PRINTING APPARATUS, INFORMATION PROCESSING APPARATUS AND STORAGE MEDIUM STORING FONT DOWNLOAD CONTROL PROGRAM

(75) Inventor: Koji Nakagiri, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/564,022

(22) Filed: May 4, 2000

Related U.S. Application Data

(62) Division of application No. 08/597,868, filed on Feb. 7, 1996.

(30) Foreign Application Priority Data

| Feb. 9, 1995 | (JP) | 7-044776 |
| Jun. 27, 1995 | (JP) | 7-160722 |
| Jan. 22, 1996 | (JP) | 8-026230 |

(51) Int. Cl.[7] .................. B41B 15/00; B41J 15/00; B65H 7/12
(52) U.S. Cl. ............. 358/1.11; 358/1.13; 358/1.15; 358/1.16; 358/1.17; 271/262; 271/263
(58) Field of Search ............... 358/1.11, 1.12, 358/1.15–1.16, 1.1, 1.7, 1.17, 1.13; 399/45, 33; 271/263, 262, 265.04

(56) References Cited

U.S. PATENT DOCUMENTS

| 5,044,790 A | 9/1991 | Kawamura | 400/76 |
| 5,276,802 A | 1/1994 | Yamaguchi et al. | 395/164 |
| 5,505,549 A | 4/1996 | Ishiguro | 400/61 |
| 5,535,311 A | 7/1996 | Zimmerman | 395/114 |
| 5,592,593 A | 1/1997 | Speed | 395/110 |
| 6,087,399 A * | 6/2000 | Kadota | 358/1.13 |

FOREIGN PATENT DOCUMENTS

| EP | 0550247 | 7/1993 | 395/114 |
| JP | A173272 | 6/1992 | |
| JP | 5-260241 | 10/1993 | |
| WO | WO 94-11805 | 5/1994 | 395/114 |

* cited by examiner

*Primary Examiner*—Edward Coles
*Assistant Examiner*—Twyler Lamb
(74) *Attorney, Agent, or Firm*—Fitzpatrick, Cella, Haprer & Scinto

(57) ABSTRACT

A printing system includes an information processing apparatus and a printing apparatus in which character image data transferred from the information processing apparatus is registered in the printing apparatus and the printing apparatus prints the same character by using the registered character image data. The information processing apparatus includes a compression unit for compressing the character image data to be transferred to the printing apparatus. The printing apparatus includes a registration unit for registering the compressed character image data and a decompression unit for decompressing the compressed character image data.

53 Claims, 15 Drawing Sheets

| RUN LENGTH | CODE | CODE LENGTH |
|---|---|---|
| 1~4 | 0** | 3 |
| 5~8 | 10*** | 5 |
| 9~16 | 110**** | 7 |
| 17~32 | 1110***** | 9 |
| 33~64 | 11110****** | 11 |
| 65~128 | 111110******* | 13 |

PRINTING SYSTEM, PRINTING APPARATUS, INFORMATION PROCESSING APPARATUS AND STORAGE MEDIUM STORING FONT DOWNLOAD CONTROL PROGRAM

This application is a division of application Ser. No. 08/597,868, filed Feb. 7, 1996.

BACKGROUND OF THE INVENTION

1. Field of the Invention

The present invention relates to a printing system, printing apparatus, printing method and information processing apparatus which register character image data from an information processing apparatus such as a host computer to a printing apparatus such as a printer and reuse image data registered in the printing apparatus when the same character is to be printed.

The present invention further relates to an information processing apparatus such as a host computer for downloading fonts to a printing apparatus and a storage medium storing a font download control program which is to be executed in the information processing apparatus.

2. Related Background Art

A prior art printing system which has a function to generate character image data in a host computer, generates character image data which comply with resolutions of a display and a printer, respectively, and transfers the generated character image data to the display and the printer to realize a so-called WYSIWYG print environment in which the same design as that displayed on the display is printed by the printer.

In such a print environment, character image data is transferred to the printer character by character. A method of storing the transferred character image data in the printer and reusing the stored character image data when the same character is to be printed is adopted in the prior art.

However, in the prior art printing system, when the character image data is transferred to the printer, the amount of data to be transferred is large and a print speed is lowered compared to a case where the characters are printed by using font information such as type of font, size and modification and character codes.

Further, when the character image data is stored in a RAM of the printer, the amount of the character image data is large and an available capacity of the RAM is small and a print processing speed is reduced.

Recently, the WYSIWYG (What You See Is What You Get) environment in which the same design as that displayed on the display is printed by the printer has been realized by providing a mechanism for generating the character image data in the host computer and generating the character image data which conform to the resolutions of the display and the printer, respectively, for the display and the printer. In such a printing environment, it is necessary to transfer the character image data to the printer. In the past, when the printing is to be made in this environment, a method for transferring the character image data character by character (character image drawing) or a method for storing the transferred character image data in the printer and reusing the stored image data when the same character is to be printed (character image downloading) has been used.

In the method for printing by the character image downloading, it is a common control method to select a group of characters having the same character attributes (font name, character size, cell size and character modification) as a character set and identifying the characters contained in the character set by the character codes. In this case, the image data of one character is represented by a combination of the character set and the character codes.

In order to control the character printing by the downloading from the host computer, data to indicate whether the character image data of the character to be printed has already been downloaded or not is required. Accordingly, the data indicating whether the characters have been downloaded or not is used for each character set. Hereinafter, a data area in which the data indicating whether the character has been downloaded or not is referred to as a registered character code control table. The data requires at least one bit to indicate whether the downloading has been made or not for each character code. Alternatively, all characters contained in the character set may be previously downloaded but in the character code set in which the character code is represented by a plurality of codes, the amount of data is huge and it is not practical. Accordingly, the above control method is required in downloading the characters in Japanese, Chinese or Korean.

The downloaded control memory required to attain the above needs at least one bit per character but if a memory having the number of bits corresponding to all character codes (for example, several thousands to ten and several thousands bit for Japanese) is prepared for each character set, a memory in the host is pressured. In actuality, when the printing by the downloading is to be conducted, the number of characters that can be registered is normally limited because of a limit in the capacity of the RAM on the printer. Accordingly, in the prior art, a maximum number of characters that can be registered is set for each character set, memories each for storing the character codes which correspond in number to the number of characters are provided and the downloaded character codes are stored therein a list form to control the downloaded character codes. Each time the character image is downloaded, the data indicating that it was downloaded is recorded in the registered character code control table, and when it happens that the downloading cannot be performed during the printing, the printing by the downloading is stopped and other printing method (for example, the image drawing) is selected or the previously downloaded data is deleted and the new data is downloaded in the emptied area.

In the prior art method, however, once the upper limit of the number of characters that can be registered is reached, the image data of the frequently used character image cannot be newly downloaded.

Further, since the downloaded character codes are controlled by the list, a long search time may be required to determine and record whether the character image has been downloaded or not even if it is the frequently used character image.

Further, when the character registration control table is prepared to store the character codes of the maximum number of characters which can be downloaded for each character set, the memory size on the host becomes large and may not be secured.

SUMMARY OF THE INVENTION

It is an object of the present invention to provide printing system, printing apparatus, printing method and information processing apparatus which reduce the amount of data to be transferred from an information processing apparatus such as a host computer to improve a printing speed and a printing processing speed.

It is other object of the present invention to provide an information processing apparatus which always permits the downloading of a frequently used character and a record medium storing a program to be executed in the information processing apparatus.

It is other object of the present invention to provide an information processing apparatus which reduces a time required to determine or record whether a frequently used character has been downloaded or not and a record medium storing a program to be executed in the information processing apparatus.

It is other object of the present invention to provide an information processing apparatus which reduces a memory size required for a registered character code control table and a record medium storing a program to be executed in the information processing apparatus.

In order to achieve the above objects, the printing system of the present invention comprises an information processing apparatus and a printing apparatus in which character image data transferred from the information processing apparatus is registered in the printing apparatus and the printing apparatus prints the same character by using the registered character image data. The information processing apparatus inclines compression means for compressing the character image data to be transferred to the printing apparatus, and the printing apparatus includes registration means for registering the compressed character image data and decompression means for decompressing the compressed character image data.

In order to achieve the above objects, the printing apparatus of the present invention for registering character image data transferred from an information processing apparatus and printing the same character by using the registered character image data comprises registration means for registering the character image data compressed by the information processing apparatus; and decompression means for decompressing the compressed character image data.

In order to achieve the above objects, the printing method of the present invention for registering character image data transferred from an information processing apparatus in a printing apparatus and printing the same character by using the registered character image data comprises the steps of compressing the character image data to be transferred to the printing apparatus by the information processing apparatus, registering the compressed character image data in the printing apparatus, and decompressing the compressed character image data.

In order to achieve the above objects, the information processing apparatus of the present invention in which character image data is transferred to a printing apparatus, the transferred character image data is registered in the printing apparatus, and the same character is printed by the printing apparatus by using the registered character image code comprises compression means for compressing the character code image, and transfer means for transferring the compressed character image data to the printing apparatus.

In order to achieve the above objects, the information processing apparatus of the present invention for downloading font of a printing apparatus comprises determination means for determining a frequency of use of the font to be printed by the printing apparatus, selection means for selecting a first control table when the determination means determines that the font to be printed is of a high frequency of use and a second control table when the determination means determines that the font to be printed is of a low frequency of use.

DETAILED DESCRIPTION OF THE PREFERRED EMBODIMENTS

Figure 1:
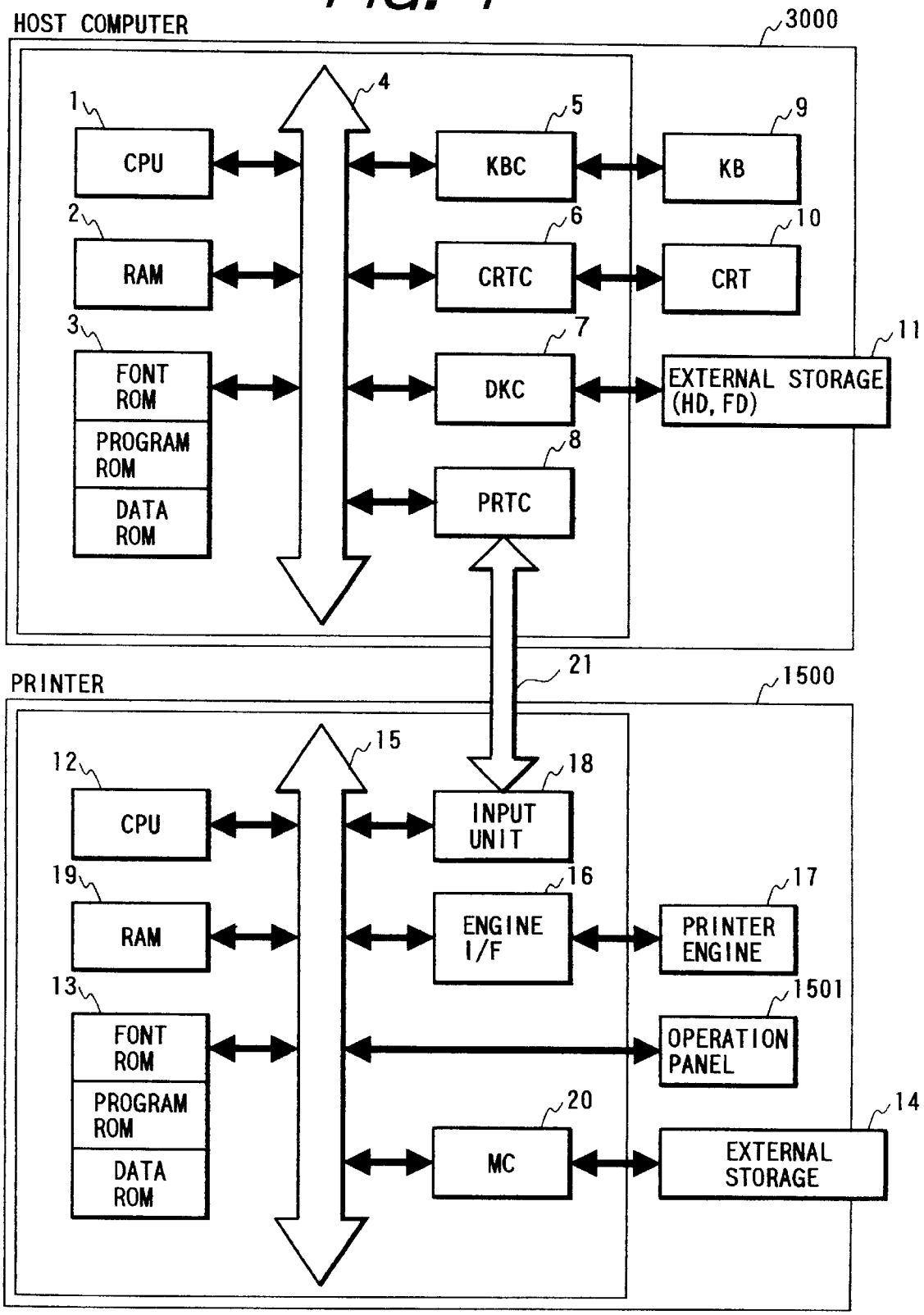
FIG. 1 shows a block diagram of a configuration of a printing system in one embodiment.

FIG. 1 shows a block diagram of a printing system in accordance with one embodiment of the present invention. It should be understood that the present invention may be applied to a single equipment, a system comprising a plurality of equipments or a system in which processing is conducted through a network such as a LAN.

In FIG. 1, numeral 3000 denotes a host computer which comprises a CPU 1 for executing document processing including graphics, images, characters and spread sheets (including table calculation) in accordance with a document processing program stored in a program ROM of a ROM 3 or an external memory 11, and the CPU 1 centrally controls devices connected to a system bus 4.

An operating system (hereinafter OS) which is a control program for the CPU 1 is stored in the program ROM of the ROM 3 or the external memory 11, font data used in processing the document is stored in a font ROM of the ROM 3 or the external memory 11, and various data used in processing the document are stored in a data ROM of the ROM 3. Numeral 2 denotes a RAM which functions as a main memory and a work area for the CPU 1. Numeral 5 denotes a keyboard controller (KBC) which controls a key entry from keyboard 9 and a pointing device (not shown).

Numeral 6 denotes a CRT controller (CRTC) which controls the display of a CRT display (CRT) unit 10. Numeral 7 denotes a disk controller (DKC) which controls the accessing to the external memory such as a hard disk (HD) or a floppy disk (FD) which stores a booting program, various applications, font data, user files, edit files, character image data generation program (hereinafter font rasterizer) and printer control command generation program (hereinafter printer driver). Numeral 8 denotes a printer controller (PRTC) which is connected to a printer 1500 through a predetermined bilateral interface (hereinafter interface) 21 to execute a communication control process with the printer 1500. The CPU 1 may execute development (rasterize) process of an outline font into a display information RAM established on the RAM 2 to permit the WYSIWYG on the CRT 10. The CPU 1 opens various registered commands in accordance with a command pointed by a mouse cursor (not shown) on the CRT 10 to execute various data processing.

In the printer 1500, numeral 12 denotes a printer CPU which outputs an image signal as output information to a printing unit (printer engine) 17 connected to a system bus 15 in accordance with the control program stored in the program ROM of the ROM 13 or the control program stored in the external memory 14. The program ROM of the ROM 13 also stores the control program for the CPU 12. The font ROM of the ROM 13 stores font data used in generating the output information and the data ROM of the ROM 13 stores information used on the host computer for the printer having no external memory 14 such as a hard disk. The CPU 12 is capable of communicating with the host computer 3000 through an input unit 18 and can pass the information in the printer 1500 to the host computer 3000. Numeral 19 denotes a RAM which functions as a main memory or a work area for the CPU 12 and can expand the memory capacity by an optional RAM connected to an expansion port (not shown). The RAM 19 is used for an output information developing area, an environment data storage area or an NVRAM. The external memory 14 such as a hard disk (HD) or an IC card is access controlled by a memory controller (MC) 20. The external memory 14 is connected as an option to store font data, emulation program or form data. Numeral 1501 denotes a console panel on which manipulation switches and LED displays are arranged.

The external memory 14 is not limited to one in number but it may comprise at least one memory so that a plurality of external memories storing built-in fonts as well as an optional font card and a program for interpreting printer control languages of different languages may be connected. It may also include an NVRAM (not shown) to store printer mode setting information from the console panel 1501.

One embodiment of the present invention is now explained in detail with reference to a flow chart of a character printing process routine by a printer driver executed by the CPU 1 shown in FIG. 2. First, print data is received (step S21) from an operating system (OS) of the host computer 3000 or an application which controls the printer driver.

Whether the character image data of the character indicated by the received print data has been registered in the printer or not is determined (step S22). If it has been registered, a command to print the registered character is generated (step S28).

On the other hand, if it has not been registered in the step S22, the character image data is acquired from the font rasterizer based on the print data received in the step S21 (step S23). The acquired image data is compressed (step S24), a command to register the compressed character image data in the printer 1500 is generated (step S25), and the generated registration command is transferred to the printer 1500 (step S26).

A flag indicating that the character indicated by the print data has already been registered in the printer 1500 is set (step S27), a command to print the character registered in the printer 1500 is generated (step S28), and the print command for the registered character is transferred to the printer 3000 (step S29) and the process is terminated.

A specific example of the process of the printer driver (FIG. 2) is explained. The acquistion of the print data in the step S21 depends on the manner of implementation of the interface with the OS or the application which controls the printer driver, and in the specific example, the following print data is acquired.

Print data: Code FaceName Point Style Pitch x,y          (data 1)

Code: Character code
FaceName: Font face name
Point: Character size
Style: Character modification data
Pitch: Variable pitch flag
x,y: Print position FIG. 3 shows a flow chart of a registration determination process routine for determining whether the character image data has been registered or not in the step S22 of FIG. 2. In the registration determination process, a character registration control table controlled by the printer drier is used. The character registration control table indicates whether the character image data of each character has been registered in the printer or not. For example, for all character codes, registered or unregistered is represented by one bit per character. When the character image data is registered in the printer 1500, the registration flag is set at the position indicating the corresponding character in the character registration control table. In the present example, a font environment in which the character is defined by the Code, FaceName, Style and Point is assumed. Even if a different font environment is used, it is sufficient if sufficient data to specify the character in the character registration control table is included.

In the present example, the characters having the same FaceName, Style and Point are grouped into one character set and one character registration control table is used for the characters belonging to the same character set. Each character registration control table includes the following contents.

Character Registration Control Table: FaceName Point Style FlagTable          (data 2)

FaceName: Font face name
Point: Character size
Style: Character modification data
FlagTable: Registration flag table In the registration determination process, variables to be used are first initialized (step S31). Then, whether the variable i is smaller than the number N of the character registration control tables or not is determined to check whether the last one of the character registration control tables has been reached or not (step S32).

If the last character registration control table has not been reached, whether the FaceName, Style and Point of the character registration control table Table [i] coincide with the FaceName, Style and Point of the print data acquired in the step S21 or not (step S33), and if they coincide, the ON/OFF state of the flag FlagTable [Code] indicating whether the character of the character code Code of the Table [i] has been registered or not is examined (step S34).

When FlagTable [Code]=ON, it is determined that the character has been registered (step S37) and the process is terminated. When FlagTable [Code]=OFF, it is determined that the character has not been registered and the process is terminated.

If the data of the character registration control table Table [i] are different from the data of the print data in the step S33, the variable i is incremented and the process returns to the step S32 (step S35) and proceeds to the next character registration control table process.

If the coincidence of the data is not detected until the last character registration control table is reached, it is determined that the character has not been registered (step S36) and the routine is terminated.

Figure 2:
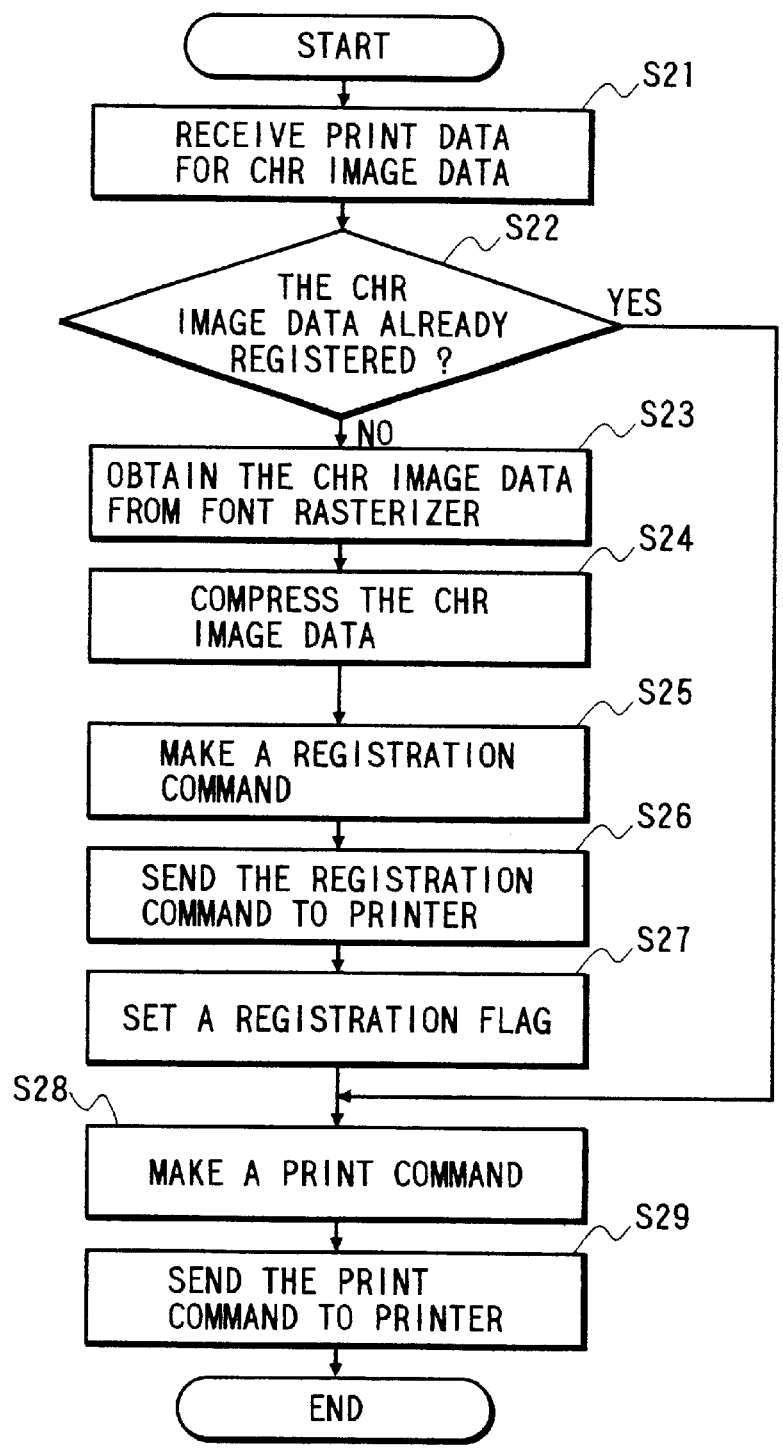
FIG. 2 shows a flow chart of a character printing process routine by a printer driver of a first embodiment.
Figure 3:
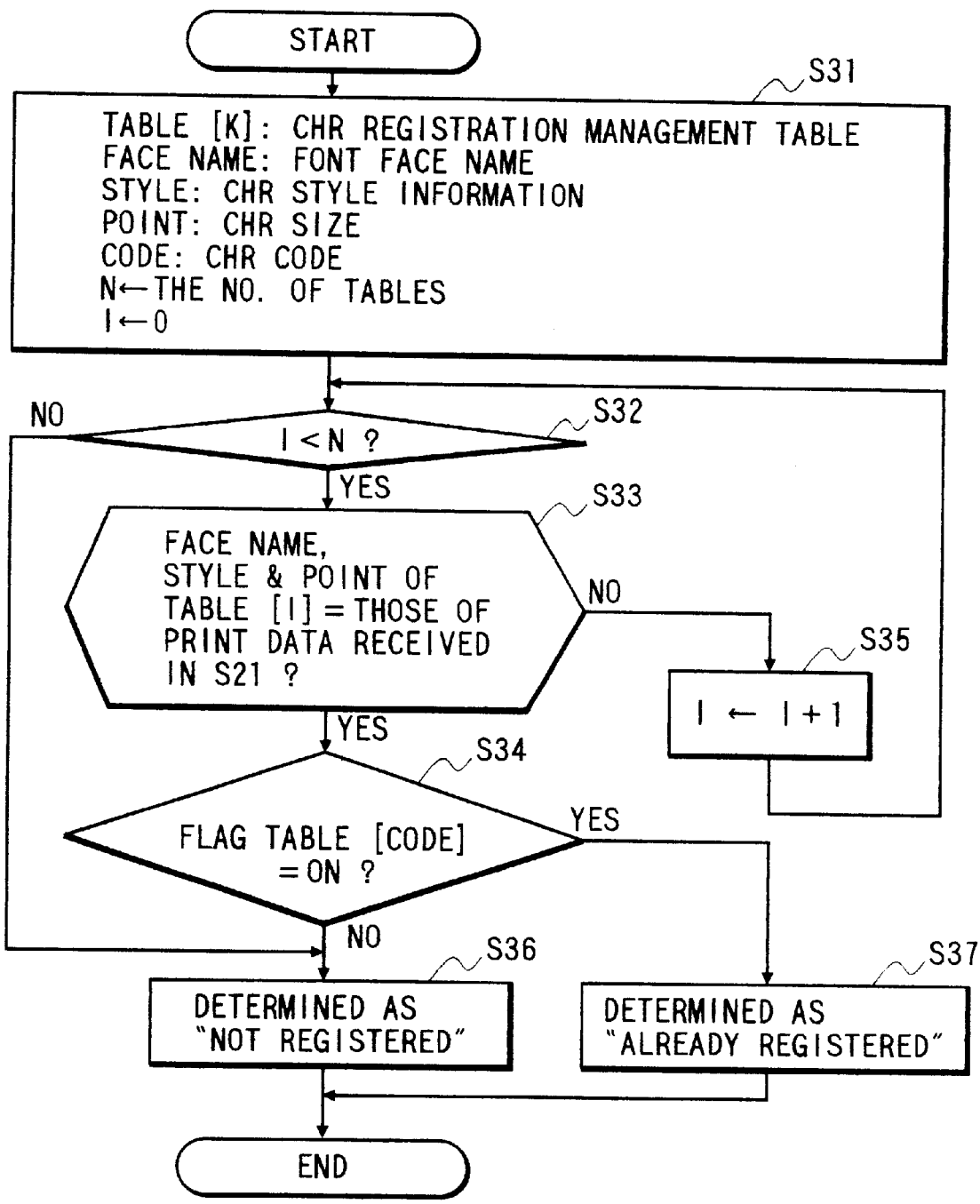
FIG. 3 shows a flow chart of a registration determination process routine for determining whether character image data has been registered or not in a step S22 of FIG. 2.

In the acquistion process of the character image data in the step S23 of FIG. 2, the character image data used for the printing is acquired from the font rasterizer in accordance with the print data acquired in the step S21.

The font rasterizer is a program for generating character image data of scalable font such as outline font and it is stored in the program ROM of the ROM 3 of FIG. 1 or the external memory 11 and loaded to the RAM 2 for execution. The data necessary to acquire the character image data depends on the specification of the OS which controls the font rasterizer. In the present example, it is assumed that all necessary data are included in the print data and the following data is transferred to the font rasterizer.

| Data for acquiring character image data: Code FaceName Point Style . . . (data 3) | |
|---|---|
| Code: | Character code |
| FaceName: | Font face name |
| Point: | Character size |
| Style: | Character modification data |

By transferring such data, the following data is acquired together with the character image data.

| Data acquired from font rasterizer: ix iy DataSize ImageData . . . (data 4) | |
|---|---|
| ix, iy: | vertical and horizontal sizes of character image |
| DataSize: | Character image data size |
| ImageData: | Character image data |

In the step S24 of FIG. 2, the character image data acquired in the step S23 is compressed. Although various compression methods may be used, it is preferable to adopt a compression method which is effective for the character compression such as two-dimensional run length, MR or MMR because the original image data is limited to the character image data. In the present example, the run length compression method by the known Wyle coding is used as the compression method.

Figures 4, 5:
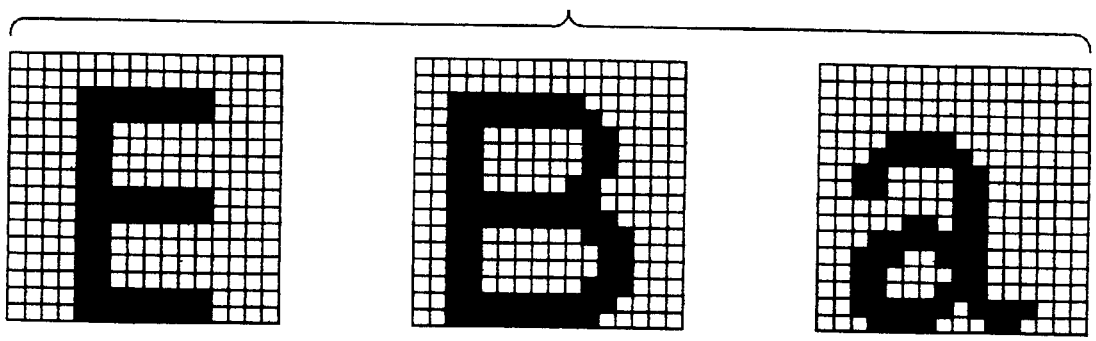
FIG. 4 illustrates a case where character image data is derived from a font rasterizer.
FIG. 5 shows a table of run length encoding.

FIG. 4 shows the character image data derived from the font rasterizer. In the image data, it is assumed that the data at the left top point of the image follows to the data of the next horizontal line and the data sequentially follows to the left of the next lower line. Data 0 represents an off bit and data 1 represents on bit. Each image data is represented by 256 bits. The run lengths of the respective character images are shown below.

| | |
|---|---|
| E: | 36, 8, 8, 8, 8, 2, 14, 2, 14, 2, 14, 2, 14, 8, 8, 8, 8, 2, 14, 2, 14, 2, 14, 2, 14, 8, 8, 8, 4 |
| B: | 34, 8, 8, 9, 7, 2, 6, 2, 6, 2, 6, 2, 6, 2, 6, 2, 6, 2, 5, 2, 7, 9, 7, 10, 6, 2, 6, 3, 5, 2, 7, 2, 5, 2, 7, 2, 5, 2, 6, 3, 5, 10, 6, 9, 5 |
| a: | 68, 4, 11, 6, 9, 2, 4, 2, 8, 2, 4, 2, 14, 2, 11, 2, 1, 2, 9, 7, 8, 3, 2, 3, 8, 2, 4, 2, 8, 2, 3, 3, 8, 6, 1, 4, 6, 4, 3, 2, 4 |

For the sake of clarification, it is assumed that the image data always starts with the off bit (0) and the first value of the run length indicates the run length of the off bit. FIG. 5 shows a table of the coding of the run length. For example, when the run length is n, (n−1) is coded by a binary number and it is inserted in an area * to obtain the coded result. For the value 36 at the top of the character E, the data 10011 which is the binary coded data of 35 is linked following to 11110 shown in 33 to 64 of the table to obtain the coded result of 11110100011. Bit sequences of the coded results of the respective character image data are shown below. It is a coded version of the run length shown above.

| | |
|---|---|
| E: | 1111010001110111101111011111011100111011 0100111011010011101101001110110110111101 1110111101111001110110100111011010011101 01001110110110111101111011101111011 <br>(149 bits) |
| B: | 1111010000110111101111101000101100011010 1001101010011010100110101001101010011010 1001101000011011011010001011011010011010 1001101010101010000110110001101000011011 0001101000011010101010100110100110101110 100010100 <br>(209 bits) |
| A: | 1111101000011011110101010101110100000101 1001101110010110011101110100011101010001 00 0001110100010110101110100010101011110010 1100110111001010010101111010100001110101 011010001011 <br>(171 bits) |

In the present example, the 256 bits are compressed to 149 bits, 209 bits and 171 bits, respectively.

In the step S25 of FIG. 2, a printer command to register the compressed character image data to the printer is generated. An example of the command is shown below.

| Character Image Data Registration Command: RC CharSetID Code ix iy size END data . . . (command 1) | |
|---|---|
| RC: | Command indicating character image data registration commands |
| CharSetID: | Character set ID |
| Code: | Character code of character to be registered |
| ix, iy: | Vertical and horizontal sizes of character image |
| size: | Size of compressed image data |
| END: | Command end code |
| data: | Compressed image data |

In the step S26 of FIG. 2, the printer command generated in the step S25 is transferred to the printer 1500 through the interface 21. In the step S27 of FIG. 2, the flag of the character registered in the printer 1500 in the step S26 is set in the character registration control table.

Figure 6:
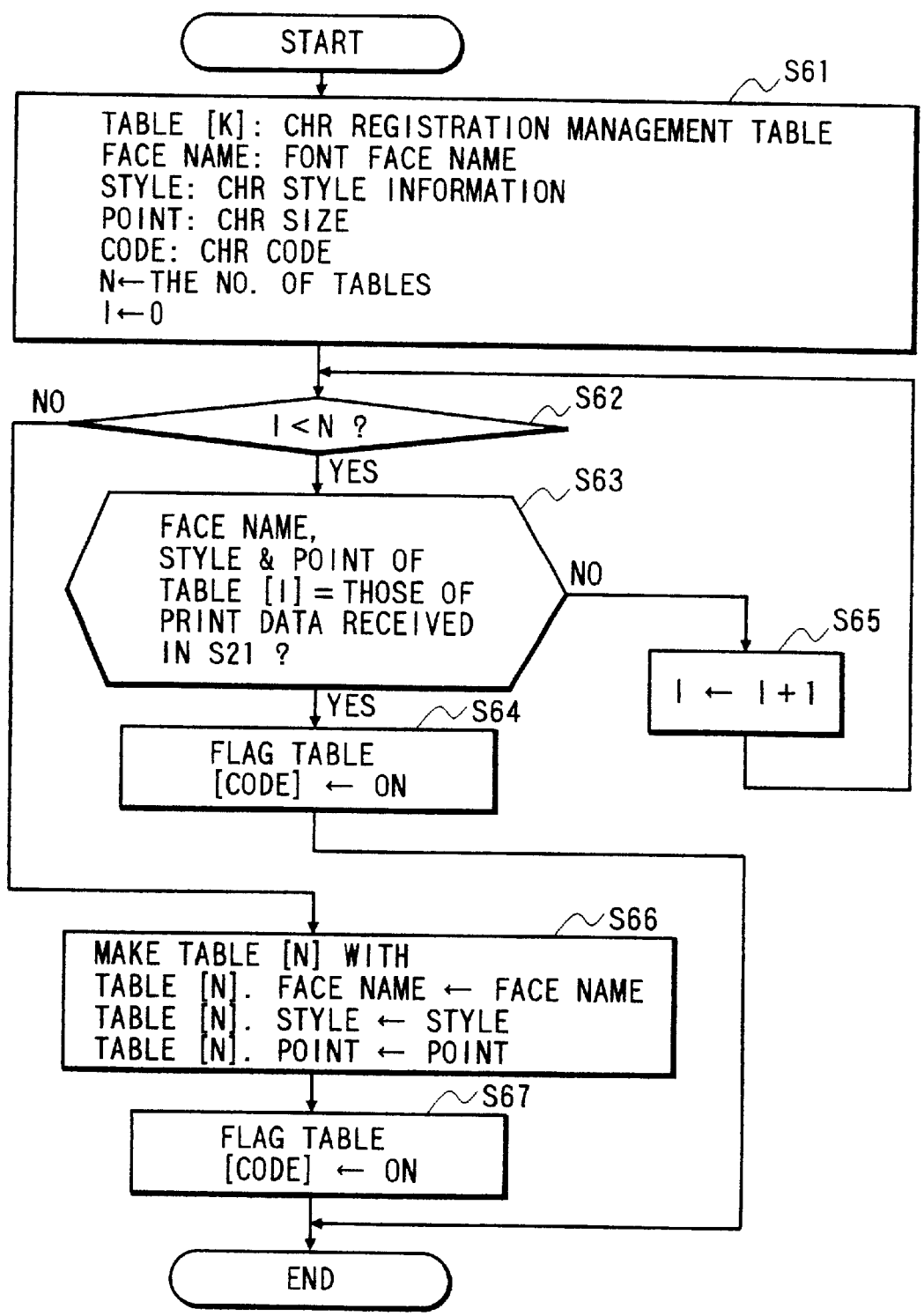
FIG. 6 shows a flow chart of a character flag set process routine.

FIG. 6 shows a flow chart of a flag set processing routine of the character. First, variables used in the present processing routine are initialized (step S61). In the next step S62, whether the variable i is smaller than the number N of character registration control tables or not is determined (step S62) to check whether the last character registration control table has been reaches or not.

Whether Facename, Style and Point of the character registration control table Table [i] coincide with FaceName, Style and Point of the print data acquired in the step S21 or not is determined (step S63), and if they coincide, the Flagtable [Code] indicating whether the character represented by the Code of the Table [i] has been registered or not is set to ON and the process of the step S64 is terminated.

If the data of the Table [i] are different from the data of the print data in the step S63, the variable i is incremented (step S65) and the process returns to the step S62 to proceed to the process for the next character registration control table.

If the coincidence of the data is not detected until the last character registration control table is reached, a new character registration control table is generated (step S66) and the registration flag FlagTable [Code] of the character represented by the Code of the new character registration control table is set to ON and the process of the step S67 is terminated.

In the step S28 of FIG. 2, a printer command to print the character registered in the printer 1500 is generated. An example of the command is shown below.

| Registered Character Print Command: DC CharSetID Code x y . . . (command 2) | |
|---|---|
| DC: | Command indicating registered character print command |
| CharSetID: | Character set ID |
| Code: | Character code of character to be printed |
| x, y: | Print position |

In the step S29, the printer command generated in the step S28 is transferred to the printer 1500 as was done in the step S26.

Figure 7:
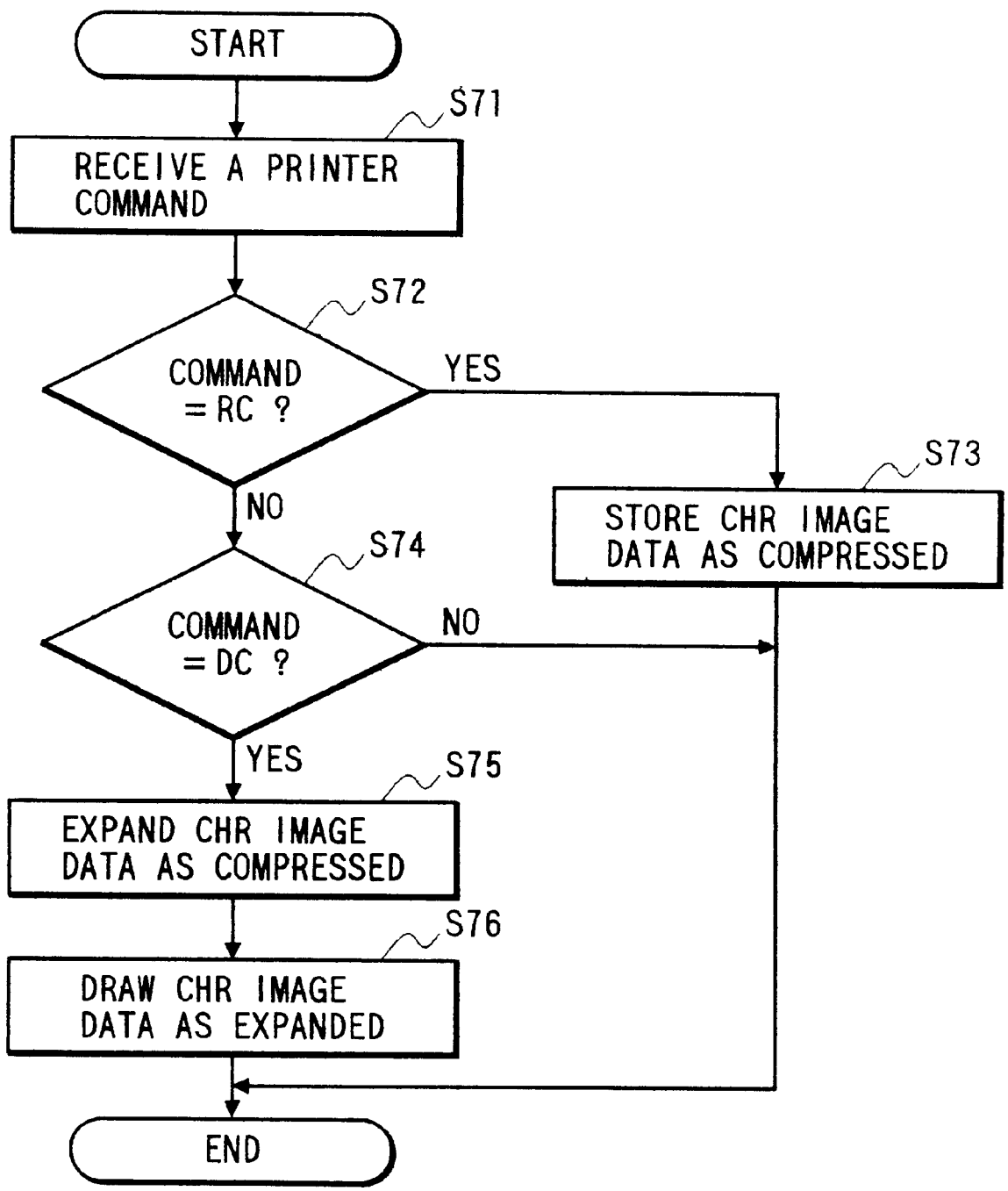
FIG. 7 shows a flow chart of a printer command decoding process routine executed by a printer 1500.

FIG. 7 shows a flow chart of a printer command decode processing routine executed by the printer 1500. The present routine shows a procedure to execute the printer command and it is repetitively executed in the normal print operation.

A print command to be executed is first received (step S71) and whether the command is a character image data registration command or a registered character print command is determined (steps S72 and S74). When it is the character image registration command, the compressed image data is stored in the RAM 19 or the external memory 14 of the printer 1500 (step S73) and the present routine is terminated.

When it is the registered character print command, the compressed character image data of the corresponding character is read from the RAM 19 or the external memory 14, the data is decompressed (step S75) and the decompressed character image data is drawn (step S76) and the present routine is terminated.

If it is neither the character image registration command nor the registered character print command, the present routine is terminated.

A specific example of the process of the printer command decode unit is shown. The program for decoding the printer command is loaded from the program ROM of the ROM 13 or the external memory 14 to the RAM 19 for execution. The data (printer command) transferred from the host computer 3000 is read into the program through the input unit 18 and grouped by command in the RAM 19.

The data by command is received in a step S71. Assuming that the portion indicating the printer command of the received data is Command, the Command is compared with the character image data registration command RC in a step S72.

In a step S73, if Command=RC, the compressed character image data is stored. The received data has the content of the command 1 described above.

| Character Image Data Registration Command: RC CharSetID Code ix iy size END data . . . (command 1) |
|---|

The following data is generated form the data derived above.

| Character Image Data Control Data: CharSetID Code ix iy data . . . (data 5) | |
|---|---|
| CharSetID: | Character set ID |
| Code: | Character code of character to be registered |
| ix, iy: | Vertical and horizontal sizes of character image |
| data: | Compressed image data |

The character image data control data is stored in the RAM 19 or the external memory 14 as one entry. The storing is conducted such that the compressed character image data of a specific character can be subsequently acquired from a plurality of entries based on the CharSetID and the Code. They may be simply arranged in sequence in a predetermined area or grouped for each CharSetID for a higher efficiency in the subsequent acquisition. In the present example, the character image control data is simply added sequentially to an area allocated on the RAM 19 for the character image data control data.

If Command=RC is not met in the step S72, whether Command=DC or not is determined in a step S74. If it is not, it means that the printer command acquired in the step S71 is not the printer command relating to the character image data and the process is terminated.

In a step S75, if Command=DC, the designated character image data is decompressed. The received data has the content of the above command 2.

| Registered Character Print Command: DC CharSetID Code x y . . . (command 2) |
|---|

Based on the data derived here, the entry having the coincident CharSetID and Code is retrieved from the entries of the character image data control data stored in the RAM 19 and it is acquired. The acquired data has the content of the above data 5.

The compressed character image data indicated by the data is decompressed in the RAM 19. The decompression is conducted by a decompression method which complies with the compression method used in the step S24 of FIG. 2. In the present example, since the run length compression method by the Wyle coding is used, it is decompressed to acquire the original character image data.

A procedure of the decompression for the compression described above is explained briefly. The number of bits from the head of the compressed data to the appearance of the first 0 is counted, and the data of the bits comprising the count plus one is taken from the succeeding data, and one is added thereto to define the first data (white).

For E described above, since 5 bits are counted until the first 0 appears, the succeeding (5+1) bits data (100011=35) is taken, to which 1 is added so that the run length of the first white data is 36. An example of the compressed data and the decompressed data is shown below.

E: 1111010001110111 . . .

E: 36, 8, . . .

Similar process is repeated and the data is converted to the run length data assuming that the white data and the black data appear alternately.

In a step S76, the character image data acquired in the step S75 is transferred from the RAM 19 to the printing unit 17 through the bus 15 and the printing unit I/F 16 to draw the image.

As described above, in the printing system in which the character image data is transferred to the printer 1500 and registered in the printer 1500 and the character is printed by using the registered character image data, the character image data to be registered in the printer 1500 is transferred in the compressed form to reduce the amount of data transferred so that the printing speed is improved. Further, by storing the compressed character image data on the RAM 19 of the printer, the amount of data stored on the RAM 19 can be reduced and the print processing speed is improved.

Second Embodiment

Figure 8:
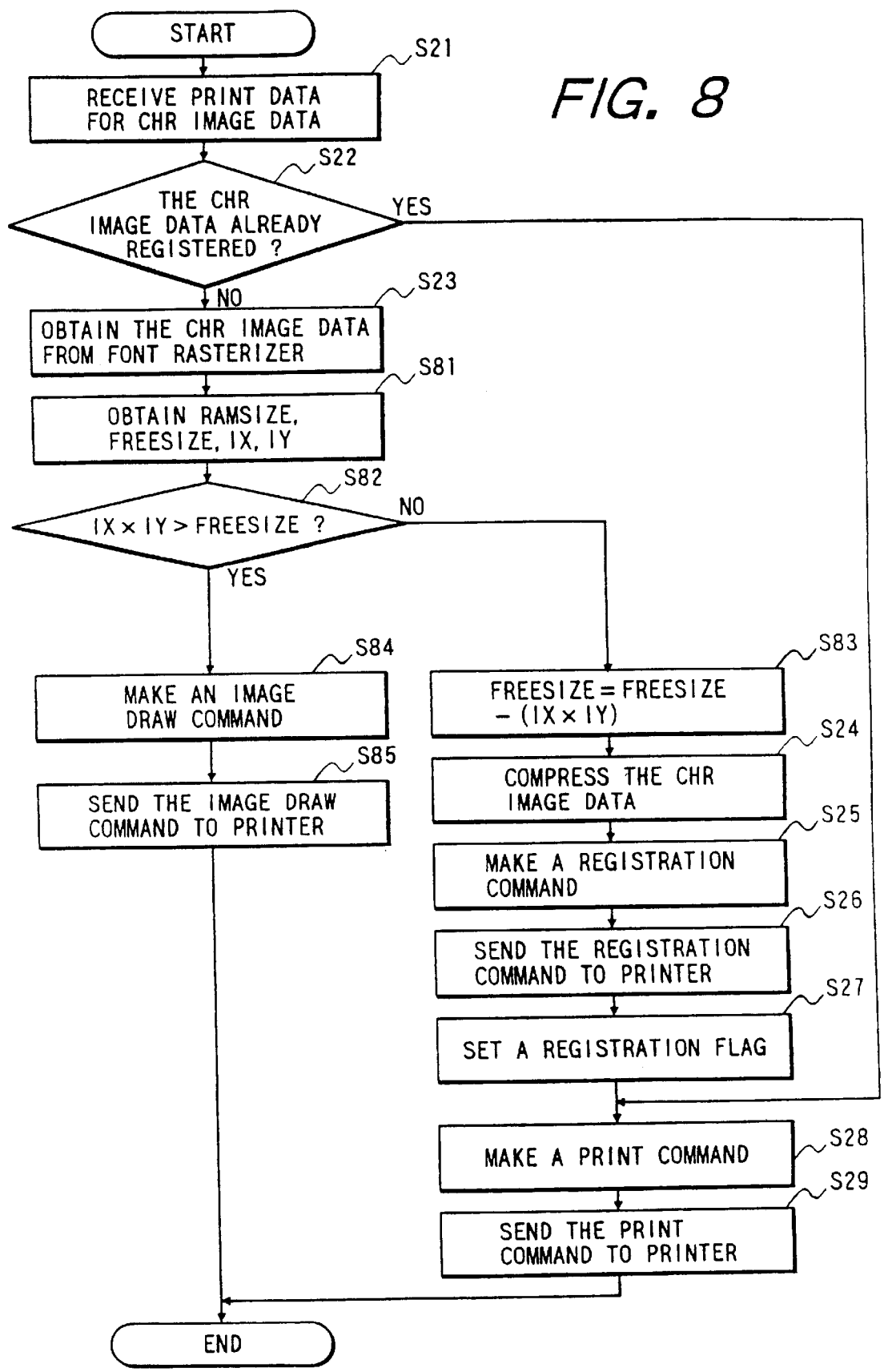
FIG. 8 shows a flow chart of a character printing process routine by a printer drive in a second embodiment.

A second embodiment of the printing system is now explained. FIG. 8 shows a flow chart of a character printing process routine by a printer driver of the second embodiment. Comparing with the first embodiment, steps S81, S82, S83, S84 and S85 are added. The like steps to those of the first embodiment are designated by the like numerals.

In the step S81, data which is a reference to determine whether the character image data of the character indicated by the character data acquired in the step S21 is to be registered in the printer or not is acquired. The data for the reference of the determination may be one of various data and in the present embodiment, the following data is used as the reference data for the determination.

| Registration Determination Reference Data: RamSize FreeSize ix iy . . . (data 5) | |
|---|---|
| RamSize: | Total capacity of registration memory for character image data |
| FreeSize: | Empty capacity of registration memory for character image data |
| ix, iy: | Vertical and horizontal sizes of character image |

The RamSize is a capacity of the character image data registration memory allocated on the RAM 19 of the printer 1500 and the FreeSize is the empty capacity. The RamSize is selected to a memory size which does not cause the reduction of the print processing speed when the memory space is used for the character image data registration. The RamSize is owned by the printer driver as fixed data and it may be modified by any means.

In a step S82, whether the image data size (product of ix and iy) is larger than the FreeSize or not is determined. This is a process to determine whether the character image data may be additionally registered in the empty area of the memory or not. In actuality, since the character image data is stored in the compressed form, the data size after the compression should be used but since the compression process becomes wasteful if the registration is not selected, the data size before the compression is used in the present embodiment on the assumption that the compressed data size is surely smaller than the uncompressed data size.

When the memory is used for the registration of the character other than the character image data, a sum of the size to be used and the size of the character image data should be compared with the FreeSize.

If it is determined that the character is registerable in the step S82, the value of the FreeSize is updated in a step S83. When the memory is used for the data other than the character image data, that size should be reduced from the FreeSize.

On the other hand, if it is determined that the registration is not permitted in the step S82, the character image data is transferred to the printer 1500 to draw the image. In this case, the following printer command including the print position, the vertical and horizontal sizes of the character image data and a total data size (the number of bytes) required to decode the printer command is generate (step S84).

| Image Data Draw Command: DI x y ix iy size END data . . . (command 3) | |
|---|---|
| DI: | Command indicating image draw command |
| x, y: | Coordinates of print position |
| ix, iy: | Image data size |
| size: | Total data size |
| END: | Command end code |
| data: | Image data |

In a step S86, the data (command 3) generated in the step S85 is transferred to the printer 1500 through the interface 21.

Figure 9:
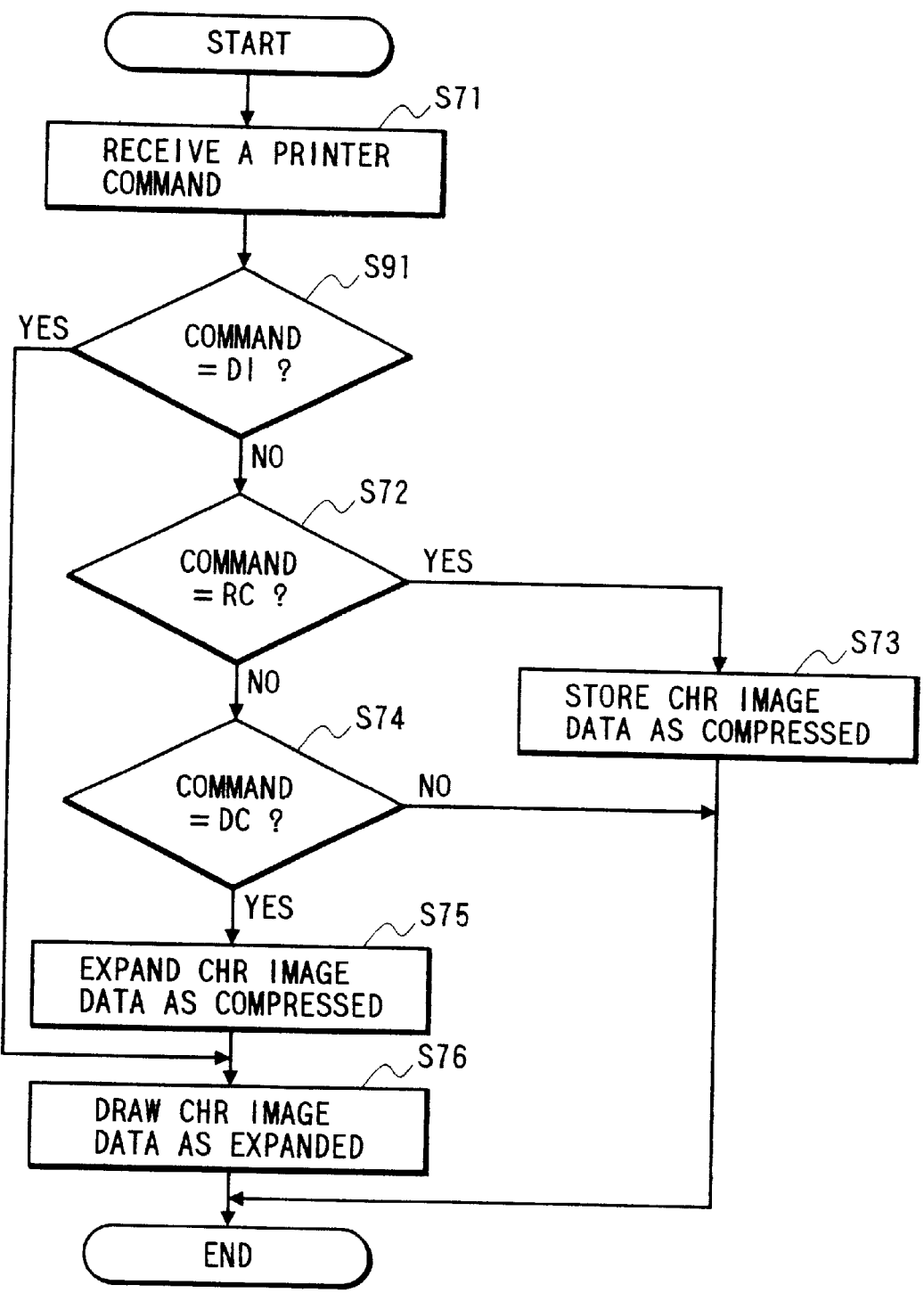
FIG. 9 shows a flow chart of a printer command decoding process routine in the second embodiment.

FIG. 9 shows a flow chart of the printer command decode processing routine of the second embodiment. The like steps to those shown in FIG. 7 are designated by the like numerals.

In a step S91, whether the acquired printer command is the image data draw command generated in the step S84 or not is determined. If it is the image data draw command, the image data draw process of the step S76 is conducted.

As described above, in the printing system in which the character image data is transferred to the printer 1500 in the compressed form and registered in the printer and it is decompressed when it is to be used for printing, whether it is to be registered in the printer 1500 or not is determined based on the character to be printed so that the amount of data stored in the RAM 19 of the printer is reduced and the print processing speed is improved.

Third Embodiment

Figure 10:
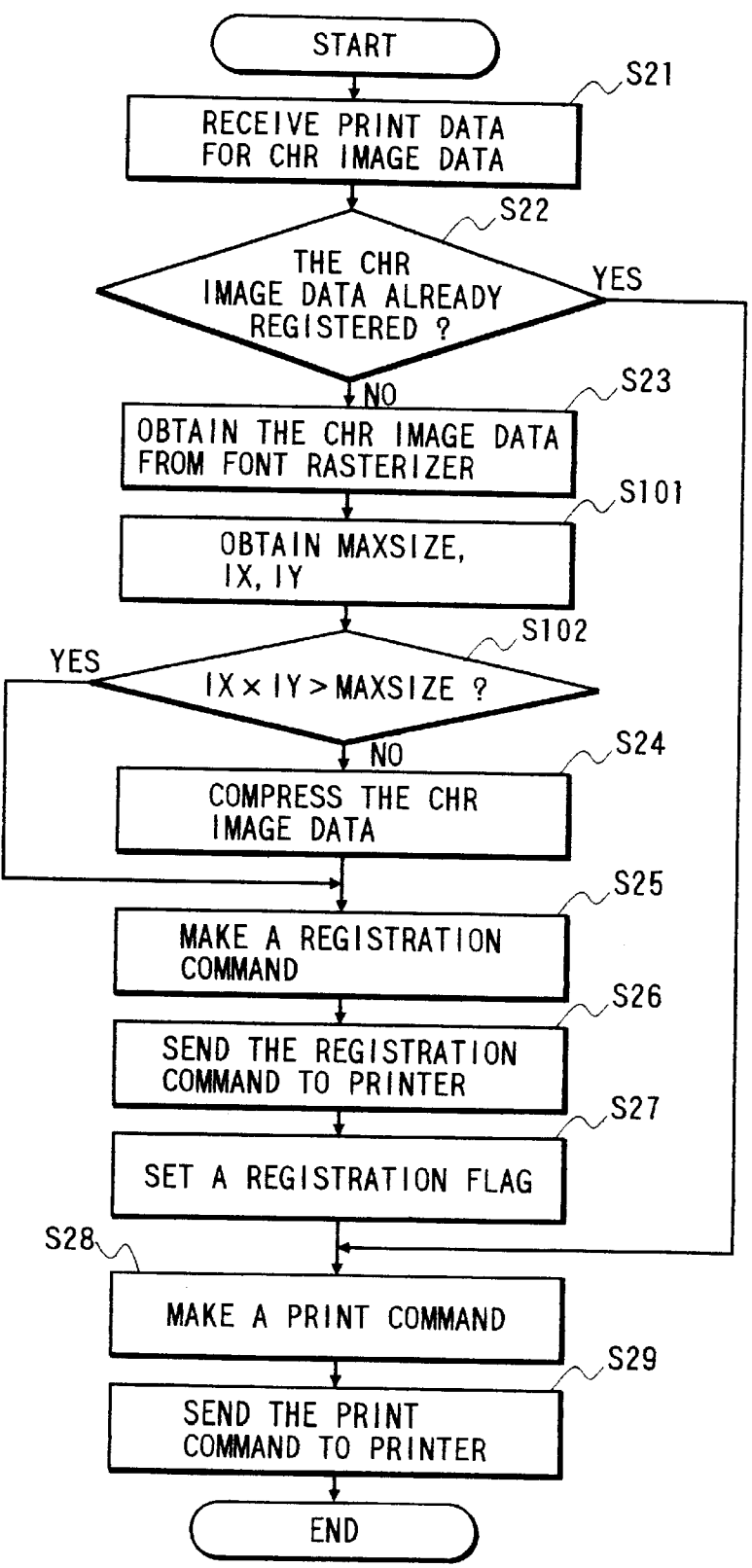
FIG. 10 shows a flow chart of a character printing process routine by a printer drive in a third embodiment.

A printing system of a third embodiment is now explained. FIG. 10 shows a flow chart of a character print processing routine by a printer driver of the third embodiment. Comparing with the first embodiment shown in FIG. 2, steps S101 and S102 are added. The like steps to those of the first embodiment are designated by the like numerals.

In the step S101, data which is a reference to determine whether the character image data of the character indicated by the print data acquired in the step S21 is to be registered in the printer 1500 in the compressed form or not is acquired. Various data may be used as the reference for the determination and in the present embodiment, the following data is used as the reference data for the determination.

| Compression Determination Reference Data: MaxSize ix iy ... (data 6) | |
| --- | --- |
| MaxSize: | Maximum possible compression and decompression image size |
| ix, iy: | Vertical and horizontal sizes of character image |

The MaxSize is a smaller one of a maximum image data size which the program for executing the compression in the printer driver can process and a maximum image data size which the program for executing the decompression in the printer can process. The MaxSize is preset in the printer driver as fixed data.

In the step S102, whether the image data size (product of ix and iy) is larger than the MaxSize or not is determined. This step determines whether the compression and the decompression of the character image data are permitted or not. If it is determined that the compression is not permitted, the character image data is registered in the printer 1500 without compression. To this end, the printer command generated in the generation process of the character registration command of the step S25 is modified as described below so that it may be used in both compression mode and non-compression mode.

| Character Image Data Registration Command 2: RC CharSetID Code ix iy CompressFlag size END data ... (command 4) | |
| --- | --- |
| RC: | Command indicating character image data registration command |
| CharSetID: | Character set ID |
| Code: | Character code of character to be registered |
| ix, iy: | Vertical and horizontal sizes of character image |
| CompressFlag: | Compression flag |
| size: | Transfer data size |
| END: | Command end code |
| data: | data |

The data is the compressed data when CompressFlag=ON and it is the non-compressed data when CompressFlag=OFF.

Figure 11:
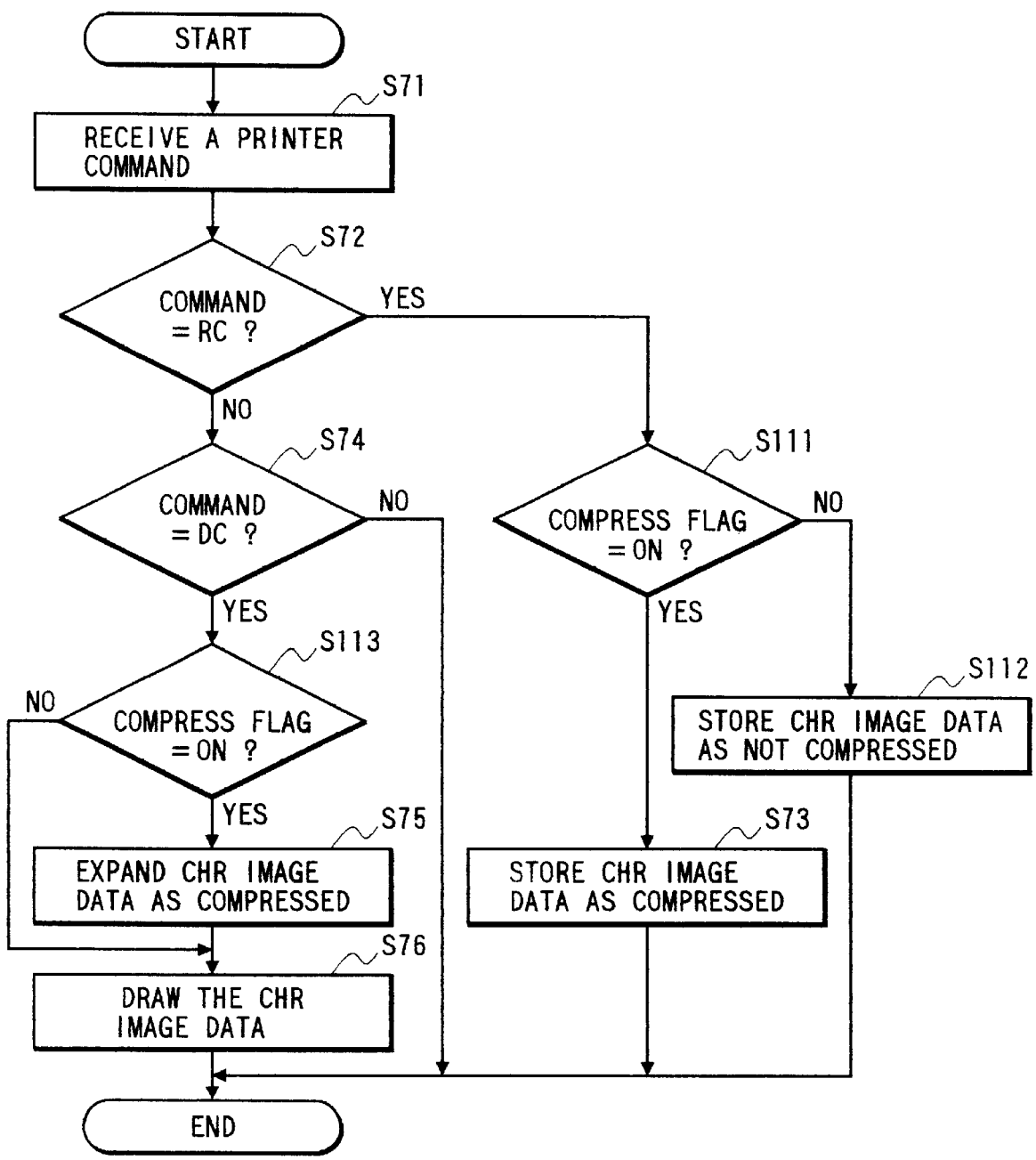
FIG. 11 shows a flow chart of a printer command decoding process routine of the third embodiment.

FIG. 11 shows a flow chart of a printer command decode processing routine of the third embodiment. The like steps to those of the second embodiment are designated by the like numerals.

In a step S111, whether the CompressFlag data of the character image data registration command 2 is ON (compress) or not is determined. Depending on whether the CompressFlag is ON or OFF, the compressed character image data is stored (step S73) or the non-compressed character image data is stored (step S112). The received data is the content of the above command 4. Based on the derived data, the following data is generated.

| Character Image Data Control Data 2: CharSetID Code ix iy CompressFlag data ... (data 7) | |
| --- | --- |
| CharSetID: | Character set ID |
| Code: | Character code of character to be registered |
| ix, iy: | Vertical and horizontal sizes of character image |
| CompressFlag: | Compression flag |
| data: | data |

By using the character image control data 2 in place of the character image data control data, the compressed character image data as well as the non-compressed character image data can be registered.

In a step S113, the value of the CompressFlag of the character image data control data 2 is examined in printing the registered character image, and if it is ON, the character image data is decompressed (step S75). If it is OFF, it means that the data is not compressed and the step S75 is not executed.

As described above, in the printing system in which the character image data is transferred to the printer 1500 in the compressed form and registered in the printer 1500 and it is decompressed when it is to be printed, whether it is to be registered in the compressed form or the non-compressed form is determined based on the character to be printed and the data in either form may be stored in the RAM 19 of the printer 1500 so that the both the character image data which cannot be compressed and the character image data which cannot be decompressed are registered for reuse.

The compression method used in the means for ompressing the character image data may be the same as the compression method used in cashing the scalable font mounted on the printer and the decompression of the cashed character image data of the printer font and the decompression of the character image data registered and compressed by the host computer may be conducted by using the same decompression program or the decompression unit.

Fourth Embodiment

Figure 12:
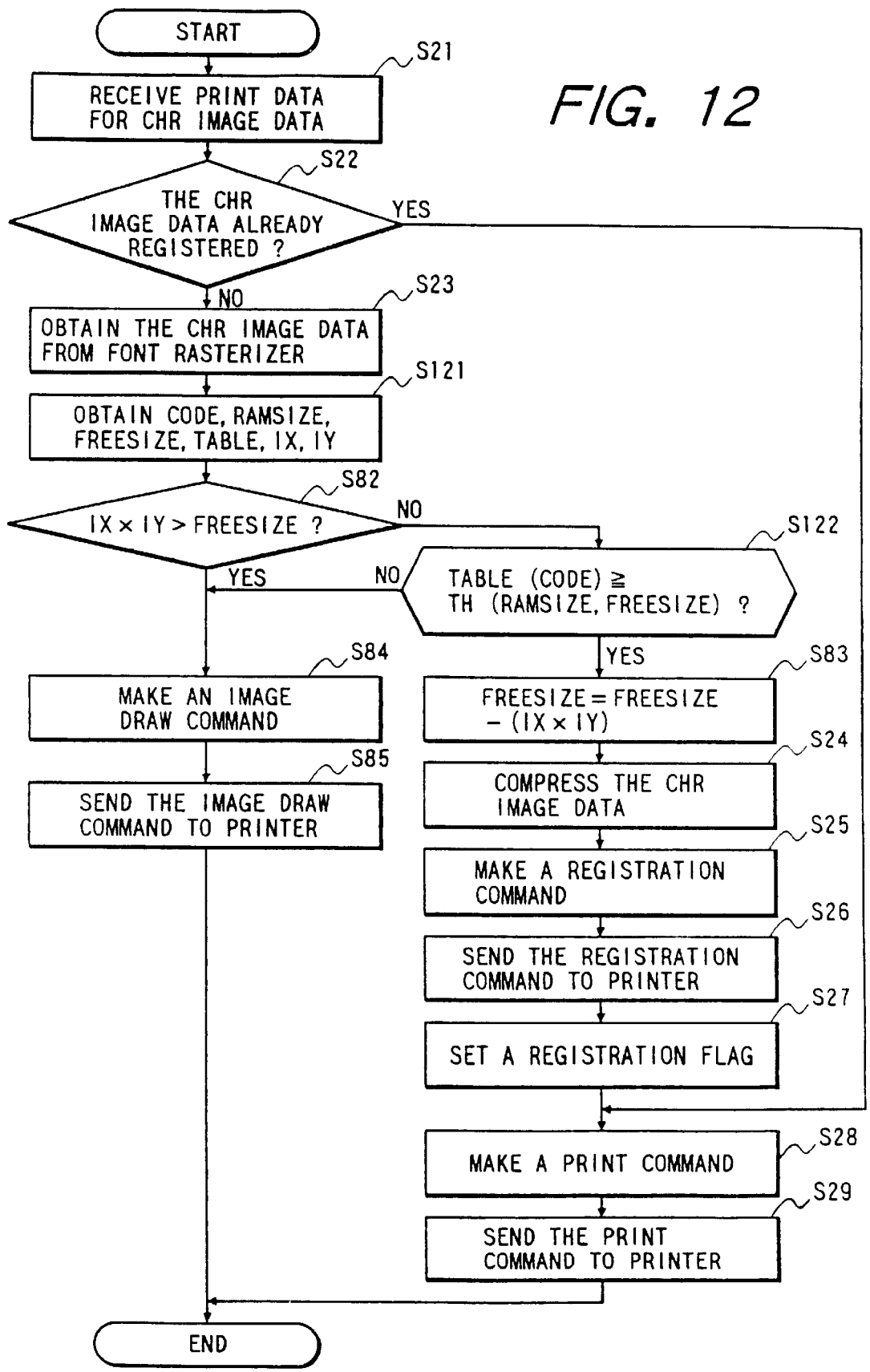
FIG. 12 shows a flow chart of a character printing process routine by a printer drive in a fourth embodiment.

A printing system of a fourth embodiment is now explained. FIG. 12 shows a flow chart of a character print processing routine by a printer driver of the fourth embodiment. The like steps to those of the first and second embodiments are designated by the like numerals.

The printing system of the fourth embodiment is characterized by means for acquiring reference data for determining whether the character image data to be printed is to be registered or not and means for determining whether the character image data to be printed is to be registered or not.

In a step S121, the data which is a reference to determine whether the image data of the character indicated by the print data acquired in the step S21 is to be registered in the printer 1500 or not is acquired. In the present embodiment, the following data is acquired.

| Registration Determination Reference Data: Code RamSize FreeSize Table ix iy ... (data 8) | |
| --- | --- |
| Code: | Character code |
| RamSize: | Total capacity of registration memory for character image data |

-continued

| Registration Determination Reference Data: Code RamSize FreeSize Table ix iy . . . (data 8) | |
|---|---|
| FreeSize: | Empty size of the registration memory for character image data |
| Table: | Frequency table |
| ix, iy: | Vertical and horizontal sizes of character image |

The RamSize is a capacity of the character image data registration memory allocated on the RAM 19 of the printer and the FreeSize is the empty capacity. The RamSize is selected such that the print processing speed is not reduced even if the memory space is used for the registration of the character image data. The RamSize is preset in the printer driver as fixed data and it may be modified by any means.

In a step S122, whether the Table (Code) which represents the value of the frequency table for the character code Code is larger than a value represented by Th (RamSize, FreeSize). The Table stores the data of frequency of use of the character for each character code. In the present embodiment, it is defined by five ranks, a value 0 indicating the lowest priority and a value 4 indicating the highest priority for each character code and they are preset in the printer driver and the data may be modified by any means. The Th (RamSize, FreeSize) represents a function which depends on the RamSize and the FreeSize and it returns the following value depending on the consumption rate of the RAM.

| Th (RamSize, FreeSize) = FreeSize/RamSize ≧ 1 | 5 |
|---|---|
| FreeSize/RamSize > 0.8 | 4 |
| FreeSize/RamSize > 0.6 | 3 |
| FreeSize/RamSize > 0.4 | 2 |
| FreeSize/RamSize > 0.2 | 1 |
| FreeSize/RamSize ≦ 0.2 | 0 |

In this manner, the registration which considers the frequency of use of the character is determined depending on the empty capacity of the memory.

As described above, in the printing system in which the character image data is transferred to the printer 1500 in the compressed form and registered in the printer 1500 and it is decompressed for use in printing, whether the character image data is to be registered in the printer 1500 or not is determined depending on the character to be printed so that the amount of data stored in the RAM 19 of the printer 1500 is reduced and the print processing speed is improved.

The printing system may comprise a single equipment or a plurality of equipments so long as it performs the same function. It may be a system in which the processing is performed through a network such as a LAN.

In accordance with the printing system described above, the character image data transferred from the information processing apparatus is registered in the printing apparatus and when the character is to be printed by using the character image data registered in the printing apparatus, it compresses the character image data transferred to the printing apparatus by the decompression means, registers the compressed character image data by the registration means and decompresses the compressed character image data by the decompression means. Thus, the amount of data transferred from the information processing apparatus to the printing apparatus is reduced and the printing speed and the print processing speed are improved.

In accordance with the printing apparatus described above in which the character image data transferred from the information processing apparatus is registered and the same character is printed by using the registered character image data, the registration means for registering the compressed character image data by the information processing apparatus and the decompression means for decompressing the compressed character image data are provided. Thus, the amount of data transferred from the information processing apparatus to the printing apparatus is reduced and the printing speed and the print processing speed are improved.

In accordance with the printing method described above in which the character image data transferred from the information processing apparatus is registered in the printing apparatus and the same character is printed by using the registered character image data, the information processing apparatus compresses the character image data transferred to the printing apparatus and the printing apparats registers the compressed character image data and decompresses the compressed image data. Thus, the amount of data transferred from the information processing apparatus to the printing apparatus is reduced and the printing speed and the print processing speed are improved.

In accordance with the information processing apparatus described above in which the character image data is transferred to the printing apparatus and the transferred character image data is registered in the printing apparatus and the same character is printed by the printing apparatus by using the registered character image data, the compression means for compressing the character image data and the transfer means for transferring the compressed character image data to the printing apparatus are provided. Thus, the amount of data transferred from the information processing apparatus to the printing apparatus is reduced and the printing speed and the print processing speed are improved.

In accordance with the printing system described above in which the information processing apparatus comprises the acquisition means for acquiring the data to determine whether the character image data is to be registered in the printing apparatus or not and the determination means for determining the registration of the character image data by using the acquired data, and the compression means compresses the character image data determined to be registered. Thus, the reduction of the memory capacity of the printing apparatus is suppressed by determining the registration in the printing apparatus depending on the character to be printed and the printing speed and the print processing speed are improved.

In accordance with the printing system described above, the acquired data includes the data on the frequency of use of the characters and the determination means determines in accordance with the data on the frequency of use. Thus, the character having a high frequency of use can be registered in preference so that the reduction of the memory capacity of the printing apparatus is suppressed and the printing speed and the print processing speed are improved.

In accordance with the printing system described above, the information processing apparatus comprises the acquisition means for acquiring the data to determine whether to compress the character image data or not and the determination means for determining the compression of the character image data by using the acquired data, and the compression means compresses the character image data determined to be compressed and the registration means registers the compressed character image data as well as the non-compressed character image data. Thus, the reduction of the memory capacity of the printing apparatus is suppressed by preferentially compressing the character having a high compression rate and the printing speed and the print processing speed are improved. When the compression or the decompression of the character image data cannot be conducted by some limitation, the character image data including the compressible characters, non-compressible characters, or the decompressible characters and the non-decompressible characters can be registered.

A fifth embodiment of the present invention is now explained with reference to a flow chart of a control program executed by the CPU 1.

Fifth Embodiment

Figure 13:
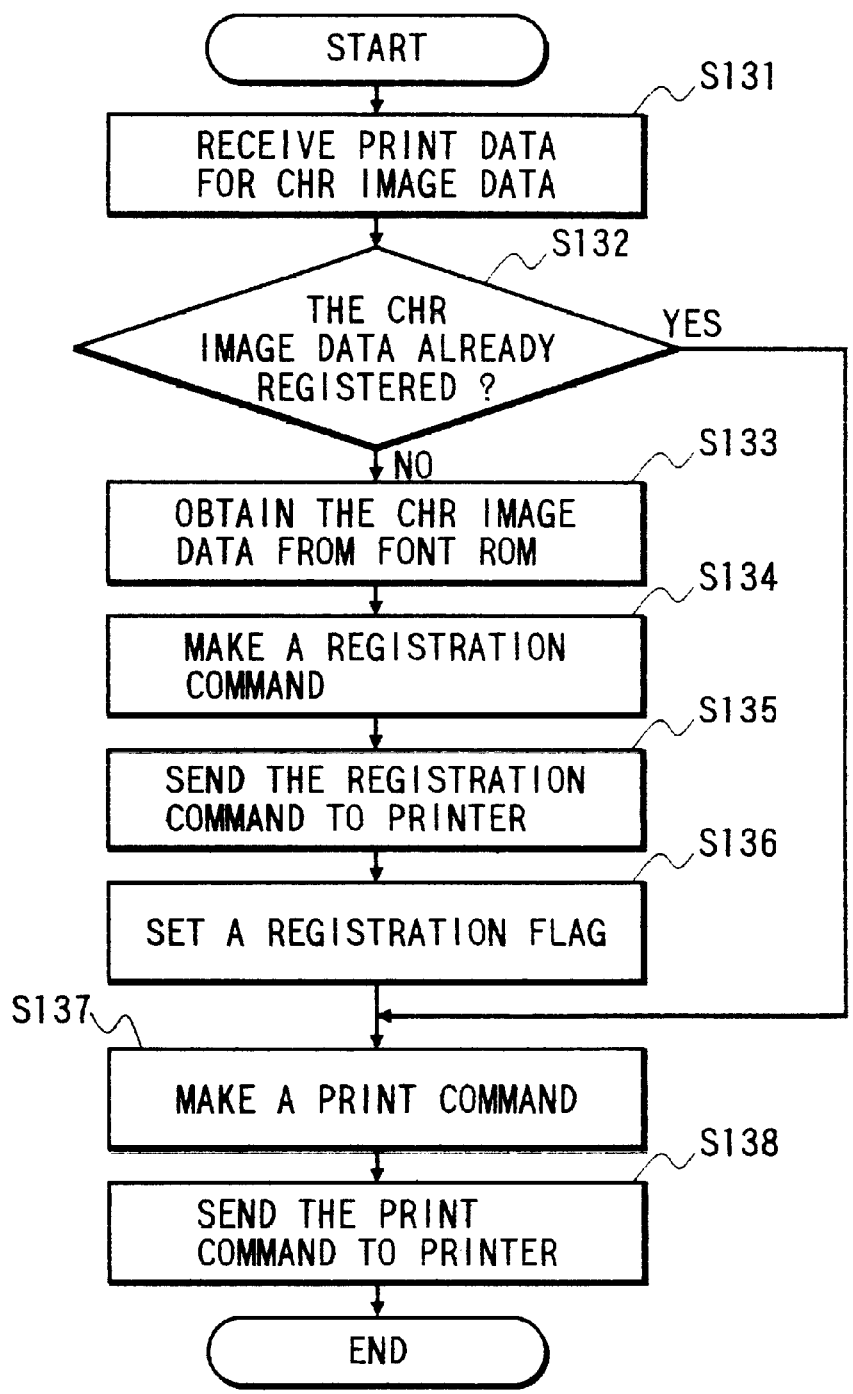
FIG. 13 shows a flow chart of a process in the printer driver for downloading a character image.

FIG. 13 shows a flow chart of a general procedure in a printer driver which downloads the character image data. First, an outline of the procedure shown in FIG. 13 is explained. In a step S131, print data is received from the operating system (OS) on the host computer 3000 controlling the printer driver or an application program. In a step S132, whether the image data of the character indicated by the print data acquired in the step S131 has been registered in the printer 1500 or not is determined. If it has been registered, the process proceeds to a step S137 to generate a command to print the registered character. If it has not been registered, the character image data is acquired from the font ROM based on the print data acquired in the step S131 (step S133). In a step S134, a printer command to register the character image data acquired in the step S133 is generated (step S134) and it is transferred to the printer (step S135). In a step S136, a flag indicating that the character indicated by the print data has already been registered in the printer is set. In a step S137, a command to print the character which has already been registered in the printer is generated and it is transferred to the printer (step S138).

In the series of those steps, the character image data control method of the present invention is implemented in the determination step of the step S132 and the registration flag setting step of the step S136.

Figure 14:
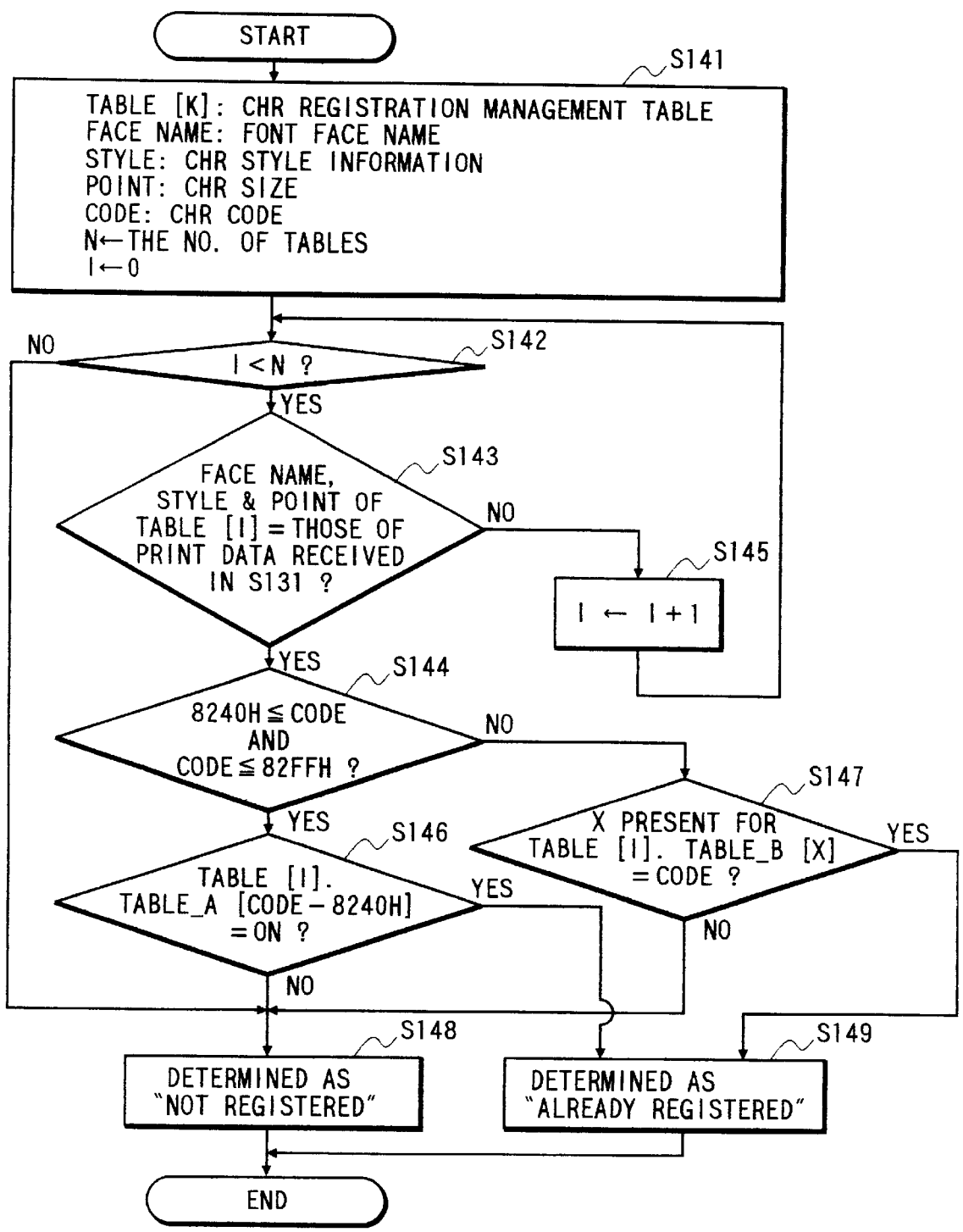
FIG. 14 shows a flow chart of a process for determining whether the downloading has been conducted or not in a character image downloading control method which implements the present invention.

The steps in which the present invention is implemented are now explained in detail. FIG. 14 shows a flow chart of the process to determine whether the registration has been made or not in the step S132. In this process, the character registration control table which is controlled by the printer driver which implement the present invention is used. A font environment in which the character is defined by Code, FaceName, Style and Point is assumed although it is suffice that sufficient data to specify the character are included. In the present embodiment, characters having same Facename, Style and Point are grouped in one character set and one character registration control table is used the characters belonging to one character set. Each character registration control table is stored in the RAM 2 with the following content including the registered character code control table as well as certain data concerning the character set.

| Character Registration Control Table: FaceName point Style Table_A Table_B . . . (data 1) | |
|---|---|
| FaceName: | Font face name |
| Point: | Character size |
| Style: | Character modification data |
| Table_A: | Registered character code control table for characters having high frequency of use |
| Table_B: | Registered character code control table for characters having low frequency of use |

In a step S141, the variables used in the process are initialized. In a step S142, whether the last character registration control table has been reached or not is determined. In a step S143, whether all of FaceName, Style and Point of the character registration control table Table [i] coincide with FaceName, Style and Point of the print data acquired in the step S131 or not is determined, and if they coincide, whether the character code is for the character of high frequency of use or not is determined (step S144). It is assumed that the Code is the shift JIS code and 824Oh to 82FFh are defined as the character code area of the high frequency of use. If the high frequency of use is detected, the Table_A (Code 824Oh) is examined (step S146), and if it is ON, it means that the registration has been made and the process is terminated. If it is OFF, it means that the registration has not been made and the process is terminated. If the low frequency of use is detected in the step S144, whether Table_B [x] having the value of Code is present in the Table_B or not is determined (step S147), and if it is present, it means that the registration has been made and the process is terminated. If it is not present, it means that the registration has not been made and the process is terminated. In the step S143, if the data of the Table [i] are different from the respective data of the print data, the process proceeds to a step for the next character registration control table (step S145). If the coincidence of the data is not detected until the last character registration control table is reached, it is determined that the registration has not been made (step S148).

Figure 15:
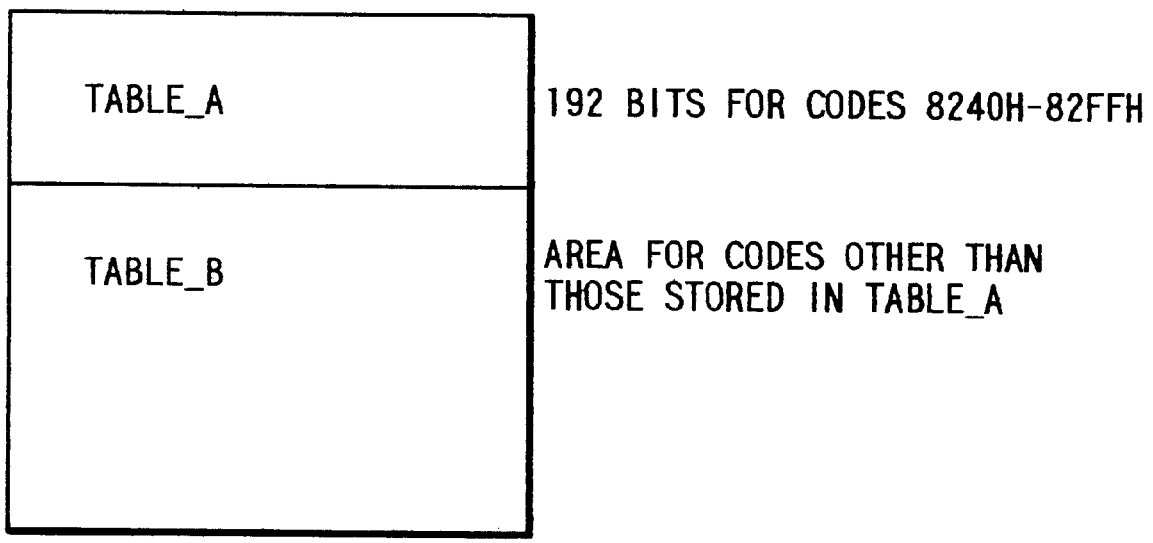
FIG. 15 shows a registered code table for recording that the image data of each character has been downloaded.

The Table_A and Table_B are explained in more detail. Those tables indicate whether the character image data has been registered in the printer or not. The content thereof is shown in FIG. 15. The table comprises a portion Table_A which represents the registration or non-registration by one bit for each character code and a portion Table_B in which the downloaded character code is added to the list to represent the registration or non-registration. For the Table_A, one bit is allocated for each character having the high frequency of use. In the present embodiment, the shift JIS code is used and the continuous 192 characters of the character codes from 814Oh to 81FFh including double byte alphanumeric and hiragana characters are allocated to the Table_A. In general, in a Japanese text, the frequency of use of hiragana characters is high and the characters such as hiragana are allocated to a continuous code area in many character code schemes. Accordingly, any code scheme other than the shift JIS may be used in the present invention so long as the characters having the high frequency of use are allocated to the continuous character code area. While the hiragana characters were discussed, the present invention may also be applicable to the character set such as katakana and symbols (including punctuation codes). Single-byte codes may be allocated to the Table_A area and the double-byte (or more) codes may be allocated to the Table_B area. The Table_B is the area to record that the character image data of the character code not belonging to the Table_A has been downloaded. For example, when the double-byte code in Japanese is used, the Table_B area is initialized to the value suitable to the code scheme (for example, 0) and the downloaded character code is added to the empty area of the Table_B to prepare the downloaded character code list. The size of the area is selected such that the sum of the numbers of characters controlled by the Table_A and the Table_B is the number of downloadable characters for each character set.

By preparing the character registration control table in this manner, when the data (flag) indicating whether the character image data has been downloaded or not is examined for the character having the high frequency of use, the flag may be uniquely determined from the character code and the time required for the determination is shorter than that in the prior art method in which all downloaded characters are stored in the memory. Since the flag for the character of the high frequency of use is one bit for each character, the total memory space used for the download control is less than that of the prior art method in which as many memory space of the character code memory as the number of downloadable characters are used. As for the Table_B, it is necessary to search the character code as it is in the prior art. In this regard, the character code is regarded as a numeral and the known Hash function is used to conduct high speed search. If the Hash function is used in searching, it is necessary to use the Hash function in recording the downloaded data and store the character code in the Table_b.

Figure 16:
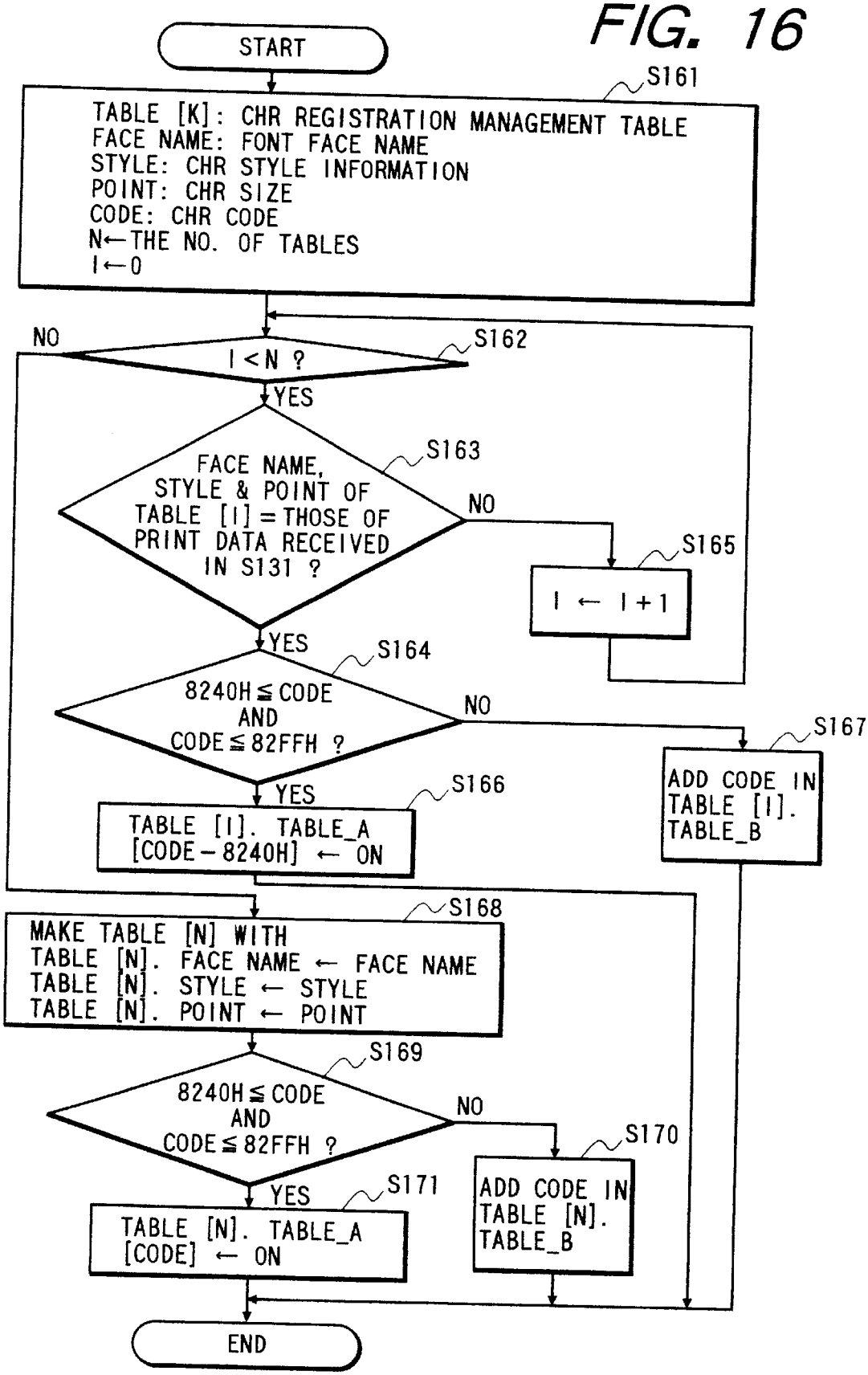
FIG. 16 shows a flow chart of a process for recording that the downloading has been conducted in a character image downloading control method which implements the present invention.

In a step S136 of FIG. 13, the flag of the character registered in the printer in the step S135 is set in the character registration control table. FIG. 16 shows a flow chart of this process. In a step S161, variables used in the process are initialized. In a step S162, whether the last character registration control table has been reached or not is determined. In a step S163, whether all of FaceName, Style and Point of the character registration control table Table [i] coincide with FaceName, Style and Point of the print data acquired in the step S131 or not is determined, and if they coincide, whether the code is of the high frequency of use or not is determined (step S164). It is assumed that the Code is the shift JIS code and 824Oh to 82FFh is the character code area of high frequency of use. If the high frequency of use is detected, the table_A [Code 824Oh] which indicates whether the character indicated by the Code has been registered or not is set to ON (step S166) and the process is terminated. If the low frequency of use is detected in the step S164, the Code is added to the Table_B of the character registration control table Table [i] as an entry (step S167) and the process is terminated. To add the entry in the step S167, it is necessary to search an empty entry as it is in the prior art. In this case, the Hash function may be used to conduct the fast search to add the entry. When the Hash function is used in adding the entry, the Hash function is also used in the step to determine whether the downloading has been conducted or not in the step S147 to search the Table_B.

If the data of the Table [i] are different from the respective data of the print data in the step S163, the process proceeds to the step for the next character registration control table (step S165). If the coincidence of the data is not detected until the last character registration control table is reached, a new character registration control table is prepared (step S168) and the registration flag Table_A [Code-824Oh] of the character indicated by the Code of the character registration control table is set to ON (step S171) or the Code is added to the Table_B as an entry (step S170) as it is in the step S164 or the step S167 and the process is terminated.

In the step S167, a condition which does not permit the downloading of new character image data may occur. It occurs when the Table_B is already filled with the downloaded character codes. In this case, the printer driver switches the printing by the downloading to other printing method (for example, image drawing) or downloads in any entry of the Table_B. In the latter case, it is necessary to inform the deletion of the character image data to the printer and download new character image data. As for the character of the high frequency of use, the download control is made by the Table_A and the condition which does not permit the downloading does not occur.

In this manner, as for the character of high frequency of use, when the flag indicating that the character image data has been downloaded is to be set, the flag may be uniquely determined from the character code and the time required to set the flag is shorter than that of the prior art method in which all downloaded characters are stored in the memory. Further, as for the character of the high frequency of use, the downloading is always permitted.

The present invention may be used in the cache data management in storing (cashing) the rasterized character image data on the memory in the font rasterizer which generates the character image data from the outline data on the computer.

The present invention may also be applied to the cache data management in cashing on the memory the character image data scaled by the scalable font defined by the outline data built in the printer.

The present invention is also applicable to the character code other than the shift JIS code shown in the embodiments such as JIS or UNICODE and other multi-byte character codes.

As to the language, the present invention is applicable to any language other than Japanese so long as the character code is represented by a plurality of bytes.

The download data to be controlled is not limited to the character image data shown in the embodiments but the present invention is applicable to the character outline data represented by the Bezier or the Spline.

In accordance with the information processing apparatus described above, the downloading of the font of the high frequency of use can always be attained.

In accordance with the information processing apparatus described above, the time required to determine whether the download has been made or not can be reduced.

In accordance with the information processing apparatus described above, the memory size required for the registration control table can be reduced.

What is claimed is:

1. A print system comprising:
an information processing apparatus; and
a printer,
wherein said information processing apparatus comprises:
a character image data compressor for compressing character image data rasterized from an outline font;
a first transmitter for transmitting, to said printer, a character registration command for registering in the printer the character image data compressed by said character image data compressor; and
a second transmitter for transmitting, to said printer, a character print command for printing the character image data registered in said printer, and
wherein said printer comprises:
a registration device for registering the character image data compressed by said character image data compressor in accordance with the character registration command transmitted by said first transmitter; and a character image data decompressor for decompressing the character image data registered by said registration device in accordance with the character print command transmitted by said second transmitter.

2. A system according to claim 1, wherein said information processing apparatus further comprises:

a registration discriminator for discriminating whether character image data for a character to be printed is registered by said registration device; and a controller for (1) obtaining character image data rasterized from an outline font corresponding to the character to be printed and controlling said character image data compressor, said first transmitter, and said second transmitter, to compress the obtained character image data, to transmit the character registration command to said printer, and to transmit the character print command to said printer, respectively, if said registration discriminator discriminates that the character image data for the character to be printed is not registered, and (2) controlling said second transmitter to transmit the character print command to said printer, if said registration discriminator discriminates that the character image data for the character to be printed is registered.

3. A system according to claim 2, wherein said information processing apparatus further comprises a print data obtainer for obtaining print data from an operating system or an application program, wherein said registration discriminator makes a discrimination based on the print data obtained by said print data obtainer.

4. A system according to claim 1, wherein said information processing apparatus further comprises a compression discriminator for discriminating, based on a size of a character to be printed, whether said character image data compressor is to compress the character image data, wherein the character registration command includes identification information indicating whether the character image data is compressed by said character image data compressor.

5. A system according to claim 4, wherein said compression discriminator makes a discrimination based on a size of the character image data.

6. A system according to claim 4, wherein said printer further comprises:

a further compression discriminator for discriminating, based on the identification information, whether the character image data is compressed; and a controller for controlling said character image data decompressor to decompress the character image data if said compression discriminator discriminates that the character image data is compressed.

7. A system according to claim 1, wherein said information processing apparatus further comprises:

a registrability discriminator for discriminating whether character image data for a character to be printed can be registered by said registration device;

a third transmitter for transmitting, to said printer, a character print command for printing the character to be printed without registering character image data for the character to be printed, if said registrability discriminator discriminates that the character image data for the character to be printed cannot be registered; and a controller for obtaining character image data rasterized from an outline font corresponding to the character to be printed and controlling said character image data compressor, said first transmitter, and said second transmitter, to compress the obtained character image data, to transmit the character registration command to said printer, and to transmit the character print command to said printer, respectively, if said registrability discriminator discriminates that the character image data for the character to be printed can be registered.

8. A system according to claim 7, wherein said information processing apparatus further comprises a registration discriminator for discriminating whether character image data for a character to be printed is registered by said registration device, wherein said registrability discriminator makes a discrimination if said registration discriminator discriminates that the character image data for the character to be printed is not registered.

9. A system according to claim 1, wherein said information processing apparatus further comprises a display for displaying a character based on the character image data rasterized from the outline font.

10. An information processing apparatus comprising:

a character image data compressor for compressing character image data rasterized from an outline font;

a first transmitter for transmitting, to a printer, a character registration command for registering in the printer the character image data compressed by said character image data compressor; and a second transmitter for transmitting, to the printer, a character print command for printing the character image data registered in the printer.

11. An apparatus according to claim 10, further comprising:

a registration discriminator for discriminating whether character image data for a character to be printed is registered in the printer; and a controller for (1) obtaining character image data rasterized from an outline font corresponding to the character to be printed and controlling said character image data compressor, said first transmitter, and said second transmitter, to compress the obtained character image data, to transmit the character registration command to the printer, and to transmit the character print command to the printer, respectively, if said registration discriminator discriminates that the character image data for the character to be printed is not registered, and (2) controlling said second transmitter to transmit the character print command to the printer, if said registration discriminator discriminates that the character image data for the character to be printed is registered.

12. An apparatus according to claim 11, further comprising a print data obtainer for obtaining print data from an operating system or an application program, wherein said registration discriminator makes a discrimination based on the print data obtained by said print data obtainer.

13. An apparatus according to claim 10, further comprising a compression discriminator for discriminating, based on a size of a character to be printed, whether said character image data compressor is to compress the character image data, wherein the character registration command includes information indicating whether the character image data is compressed by said character image data compressor.

14. An apparatus according to claim 13, wherein said compression discriminator makes a discrimination based on a size of the character image data.

15. An apparatus according to claim 10, further comprising:

a registrability discriminator for discriminating whether character image data for a character to be printed can be registered in the printer;

a third transmitter for transmitting to the printer a character print command for printing the character to be printed without registering character image data for the character to be printed, if said registrability discriminator discriminates that the character image data for the character to be printed cannot be registered; and a controller for obtaining character image data rasterized from an outline font corresponding to the character to be printed and controlling said character image data compressor, said first transmitter, and said second transmitter, to compress the obtained character image data, to transmit the character registration command to the printer, and to transmit the character print command to the printer, respectively, if said registrability discriminator discriminates that the character image data for the character to be printed can be registered.

16. An apparatus according to claim 15, further comprising a registration discriminator for discriminating whether character image data for a character to be printed is registered in the printer, wherein said registrability discriminator makes a discrimination if said registration discriminator discriminates that the character image data for the character to be printed is not registered.

17. An apparatus according to claim 10, further comprising a display for displaying a character based on the character image data rasterized from the outline font.

18. An information processing method comprising:

a compression step of compressing character image data rasterized from an outline font;

a first transmission step of transmitting, to a printer, a character registration command for registering in the printer the character image data compressed in said compression step; and a second transmission step of transmitting to the printer a character print command for printing the character image data registered in the printer.

19. A method according to claim 18, further comprising:

a registration discrimination step of discriminating whether character image data for a character to be printed is registered in the printer; and a control step of (1) obtaining character image data rasterized from an outline font corresponding to the character to be printed and controlling said compression step, said first transmission step, and said second transmission step, to compress the obtained character image data, to transmit the character registration command to the printer, and to transmit the character print command to the printer, respectively, if said registration discrimination step discriminates that the character image data for the character to be printed is not registered, and (2) controlling said second transmission step to transmit the character print command to the printer, if said registration discrimination step discriminates that the character image data for the character to be printed is registered.

20. A method according to claim 19, further comprising an obtaining step of obtaining print data from an operating system or an application program, wherein said registration discrimination step makes a discrimination based on the obtained print data.

21. A method according to claim 18, further comprising a compression discrimination step of discriminating, based on a size of a character to be printed, whether said compression step is to compress the character image data, wherein the character registration command includes information indicating whether the character image data is compressed.

22. A method according to claim 21, wherein said compression discrimination step makes a discrimination based on a size of the character image data.

23. A method according to claim 18, further comprising:

a registrability discrimination step of discriminating whether character image data for a character to be printed can be registered in the printer;

a third transmission step of transmitting to the printer a character print command for printing the character to be printed without registering character image data for the character to be printed, if said registrability discrimination step discriminates that the character image data for the character to be printed cannot be registered; and a control step of obtaining character image data rasterized from an outline font corresponding to the character to be printed and controlling said compression step, said first transmission step, and said second transmission step, to compress the obtained character image data, to transmit the character registration command to the printer, and to transmit the character print command to the printer, respectively, if said registrability discrimination step discriminates that the character image data for the character to be printed can be registered.

24. A method according to claim 23, further comprising a registration discrimination step of discriminating whether character image data for a character to be printed is registered in the printer, wherein said registrability discrimination step makes a discrimination if said registration discrimination step discriminates that the character image data for the character to be printed is not registered.

25. A method according to claim 18, further comprising a display step of displaying a character based on the character image data rasterized from the outline font.

26. A printer comprising:

a registration device for registering character image data rasterized from an outline font and compressed in accordance with a character registration command received from an information processing apparatus;

a character image data decompressor for decompressing the character image data registered by said registration device in accordance with a character print command received from the information processing apparatus; and a character image data printer for printing the character image data decompressed by said character image data decompressor.

27. A printer according to claim 26, wherein said registration device registers the character image data with compression or without compression in accordance with identification information included in the character registration command, indicating whether the character image data is compressed.

28. A printer according to claim 27, further comprising a controller for controlling said character image data decompressor and said character image data printer to decompress the registered character image data and print the decompressed character image data, respectively, if the identification information indicates that the character image data is compressed, and for controlling said character image data decompressor and said character image data printer so as not to decompress the registered character image data and to print the character image data, respectively, if the identification information indicates that the character image data is not compressed.

29. A printing method comprising:
- a registration step of registering character image data rasterized from an outline font and compressed in accordance with a character registration command received from an information processing apparatus;
- a decompression step of decompressing the character image data registered in said registration step in accordance with a character print command received from the information processing apparatus; and
- a print step of printing the character image data decompressed in said decompression step.

30. A method according to claim 29, wherein said registration step registers the character image data with compression or without compression in accordance with identification information included in the character registration command, indicating whether the character image data is compressed.

31. A method according to claim 30, further comprising a control step of controlling said decompression step and said print step to decompress the registered character image data and print the decompressed character image data, respectively, if the identification information indicates that the character image data is compressed, and of controlling said decompression step and said print step so as not to decompress the registered character image data and to print the character image data, respectively, if the identification information indicates that the character image data is not compressed.

32. A memory medium storing a program having code for executing an information processing method, the information processing method comprising:
- a compression step of compressing character image data rasterized from outline font;
- a first transmission step of transmitting, to a printer, a character registration command for registering in the printer the character image data compressed in said compression step; and
- a second transmission step of transmitting to the printer a character print command for printing the character image data registered in the printer.

33. A memory medium according to claim 32, wherein the information processing method further comprises:
- a registration discrimination step of discriminating whether character image data for a character to be printed is registered in the printer; and
- a control step of (1) obtaining character image data rasterized from outline font corresponding to the character to be printed and controlling said compression step, said first transmission step, and said second transmission step, to compress the obtained character image data, to transmit the character registration command to the printer, and to transmit the character print command to the printer, respectively, if said registration discrimination step discriminates that the character image data for the character to be printed is not registered, and (2) controlling said second transmission step to transmit the character print command to the printer, if said registration discrimination step discriminates that the character image data for the character to be printed is registered.

34. A memory medium according to claim 33, wherein the method further comprises an obtaining step of obtaining print data from an operating system or an application program, wherein said registration discrimination step makes a discrimination based on the obtained print data.

35. A memory medium according to claim 32, wherein the method further comprises a compression discrimination step of discriminating, based on a size of a character to be printed, whether said compression step is to compress the character image data, wherein the character registration command includes information indicating whether the character image data is compressed.

36. A memory medium according to claim 35, wherein said compression discrimination step makes a discrimination based on a size of the character image data.

37. A memory medium according to claim 32, wherein the method further comprises:
- a registrability discrimination step of discriminating whether character image data for a character to be printed can be registered in the printer;
- a third transmission step of transmitting to the printer a character print command for printing the character to be printed without registering character image data for the character to be printed, if said registrability discrimination step discriminates that the character image data for the character to be printed cannot be registered; and
- a control step of obtaining character image data rasterized from an outline font corresponding to the character to be printed and controlling said compression step, said first transmission step, and said second transmission step, to compress the obtained character image data, to transmit the character registration command to the printer, and to transmit the character print command to the printer, respectively, if said registrability discrimination step discriminates that the character image data for the character to be printed can be registered.

38. A memory medium according to claim 37, wherein the method further comprises a registration discrimination step of discriminating whether character image data for a character to be printed is registered in the printer, wherein said registrability discrimination step makes a discrimination if said registration discrimination step discriminates that the character image data for the character to be printed is not registered.

39. A memory medium according to claim 32, wherein the method further comprises a display step of displaying a character based on the character image data rasterized from the outline font.

40. A program product having computer-readable program code for executing an information processing method, the method comprising:
- a compression step of compressing character image data rasterized from an outline font;
- a first transmission step of transmitting, to a printer, a character registration command for registering in the printer the character image data compressed in said compression step; and
- a second transmission step of transmitting to the printer a character print command for printing the character image data registered in the printer.

41. A program product according to claim 40, wherein the method further comprises:
- a registration discrimination step of discriminating whether character image data for a character to be printed is registered in the printer; and
- a control step of (1) obtaining character image data rasterized from outline font corresponding to the character to be printed and controlling said compression step, said first transmission step, and said second transmission step, to compress the obtained character image data, to transmit the character registration command to the printer, and to transmit the character print command to the printer, respectively, if said registration discrimination step discriminates that the character image data for the character to be printed is not registered, and (2) controlling said second transmission step to transmit the character print command to the printer, if said registration discrimination step discriminates that the character image data for the character to be printed is registered.

42. A program product according to claim 41, wherein the method further comprises an obtaining step of obtaining print data from an operating system or an application program, wherein said registration discrimination step makes a discrimination based on the obtained print data.

43. A program product according to claim 40, wherein the method further comprises a compression discrimination step of discriminating, based on a size of a character to be printed, whether said compression step is to compress the character image data, wherein the character registration command includes information indicating whether the character image data is compressed.

44. A program product according to claim 43, wherein said compression discrimination step makes a discrimination based on a size of the character image data.

45. A program product according to claim 40, wherein the method further comprises:

a registrability discrimination step of discriminating whether character image data for a character to be printed can be registered in the printer;

a third transmission step of transmitting to the printer a character print command for printing the character to be printed without registering character image data for the character to be printed, if said registrability discrimination step discriminates that the character image data for the character to be printed cannot be registered; and a control step of obtaining character image data rasterized from outline font corresponding to the character to be printed and controlling said compression step, said first transmission step, and said second transmission step, to compress the obtained character image data, to transmit the character registration command to the printer, and to transmit the character print command to the printer, respectively, if said registrability discrimination step discriminates that the character image data for the character to be printed can be registered.

46. A program product according to claim 45, wherein the method further comprises a registration discrimination step of discriminating whether character image data for a character to be printed is registered in the printer, wherein said registrability discrimination step makes a discrimination if said registration discrimination step discriminates that the character image data for the character to be printed is not registered.

47. A program product according to claim 40, wherein the method further comprises a display step of displaying a character based on the character image data rasterized from the outline font.

48. A memory medium storing a program having code for executing a printing method, the printing method comprising:

a registration step of registering character image data rasterized from an outline font and compressed in accordance with a character registration command received from an information processing apparatus;

a decompression step of decompressing the character image data registered in said registration step in accordance with a character print command received from the information processing apparatus; and a print step of printing the character image data decompressed in said decompression step.

49. A memory medium according to claim 48, wherein said registration step registers the character image data with compression or without compression in accordance with identification information included in the character registration command, indicating whether the character image data is compressed.

50. A memory medium according to claim 49, wherein the printing method further comprises a control step of controlling said decompression step and said print step to decompress the registered character image data and print the decompressed character image data, respectively, if the identification information indicates that the character image data is compressed, and of controlling said decompression step and said print step so as not to decompress the registered character image data and to print the character image data, respectively, if the identification information indicates that the character image data is not compressed.

51. A program product having computer-readable code for executing a printing method, the printing method comprising:

a registration step of registering character image data rasterized from an outline font and compressed in accordance with a character registration command received from an information processing apparatus;

a decompression step of decompressing the character image data registered in said registration step in accordance with a character print command received from the information processing apparatus; and a print step of printing the character image data decompressed in said decompression step.

52. A program product according to claim 51, wherein said registration step registers the character image data with compression or without compression in accordance with identification information included in the character registration command, indicating whether the character image data is compressed.

53. A program product according to claim 52, wherein the printing method further comprises a control step of controlling said decompression step and said print step to decompress the registered character image data and print the decompressed character image data, respectively, if the identification information indicates that the character image data is compressed, and of controlling said decompression step and said print step so as not to decompress the registered character image data and to print the character image data, respectively, if the identification information indicates that the character image data is not compressed.

* * * * *

UNITED STATES PATENT AND TRADEMARK OFFICE
CERTIFICATE OF CORRECTION

PATENT NO.    : 6,351,314 B1
DATED         : February 26, 2002
INVENTOR(S)   : Koji Nakagiri It is certified that error appears in the above-identified patent and that said Letters Patent is hereby corrected as shown below:

Title page,
Item [74], *Attorney, Agent, or Firm*- "Fitzpatrick, Cella, Haprer & Scinto" should read
-- Fitzpatrick, Cella, Harper & Scinto --.

Column 2,
Line 42, "other" should read -- another --.

Column 3,
Line 1, "other" should read -- another --;
Line 6, "other" should read -- another --; and
Line 12, "other" should read -- another --.

Column 9,
Line 6, "reaches" should read -- reached --; and
Line 7, Facename," should read -- FaceName, --.

Column 12,
Line 25, "generate" should read -- generated --.

Column 14,
Line 30, "the both" should read -- both --; and
Line 33, "ompress-" should read -- compress- --.

Column 16,
Line 20, "apparats" should read -- apparatus --.

UNITED STATES PATENT AND TRADEMARK OFFICE
CERTIFICATE OF CORRECTION

PATENT NO. : 6,351,314 B1
DATED : February 26, 2002
INVENTOR(S) : Koji Nakagiri

It is certified that error appears in the above-identified patent and that said Letters Patent is hereby corrected as shown below:

Column 17,
Line 48, "implement" should read -- implements --; and
Line 52, "Facename," should read -- FaceName, --.

Signed and Sealed this

Eighteenth Day of June, 2002

Attest:

Attesting Officer

JAMES E. ROGAN
Director of the United States Patent and Trademark Office